(12) United States Patent
Matsuzaki

(10) Patent No.: US 8,198,936 B2
(45) Date of Patent: Jun. 12, 2012

(54) SEMICONDUCTOR DEVICE

(75) Inventor: Takanori Matsuzaki, Atsugi (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 214 days.

(21) Appl. No.: 12/753,984

(22) Filed: Apr. 5, 2010

(65) Prior Publication Data

US 2010/0266070 A1   Oct. 21, 2010

(30) Foreign Application Priority Data

Apr. 16, 2009 (JP) ................. 2009-100104

(51) Int. Cl.
*H03D 1/10* (2006.01)
*H04L 27/06* (2006.01)
*H04B 1/16* (2006.01)

(52) U.S. Cl. ........ 329/366; 329/340; 329/347; 329/363; 329/365; 329/370; 375/324; 455/337

(58) Field of Classification Search ............. 235/492; 329/304, 305, 317, 340, 347, 348, 363, 365–367, 329/370; 375/324, 340; 455/21, 337
See application file for complete search history.

(56) References Cited

U.S. PATENT DOCUMENTS

| 6,848,620 B2 | 2/2005 | Nakane et al. |
| 7,877,068 B2 * | 1/2011 | Atsumi et al. ........... 455/134 |
| 2006/0192019 A1 | 8/2006 | Kato et al. |
| 2007/0252208 A1 | 11/2007 | Koyama et al. |
| 2008/0111702 A1 | 5/2008 | Osada |
| 2008/0149737 A1 | 6/2008 | Ohshima |
| 2008/0149738 A1 | 6/2008 | Fujita et al. |
| 2008/0153450 A1 | 6/2008 | Atsumi et al. |
| 2009/0085638 A1 | 4/2009 | Shionoiri et al. |

FOREIGN PATENT DOCUMENTS

| EP | 1251458 | 10/2002 |
| JP | 2000-172806 | 6/2000 |
| JP | 2002-319007 | 10/2002 |
| JP | 2006-268838 | 10/2006 |
| JP | 2008-182687 | 8/2008 |

* cited by examiner

*Primary Examiner* — Levi Gannon

(74) *Attorney, Agent, or Firm* — Eric J. Robinson; Robinson Intellectual Property Law Office, P.C.

(57) ABSTRACT

A semiconductor device is provided, which comprises a first demodulation circuit, a second demodulation circuit, a first bias circuit, a second bias circuit, a comparator, an analog buffer circuit, and a pulse detection circuit. An input portion of the pulse detection circuit is electrically connected to an output portion of the analog buffer circuit, a first output portion of the pulse detection circuit is electrically connected to an input portion of the first bias circuit, and a second output portion of the pulse detection circuit is electrically connected to an input portion of the second bias circuit.

18 Claims, 22 Drawing Sheets

FIG. 4A
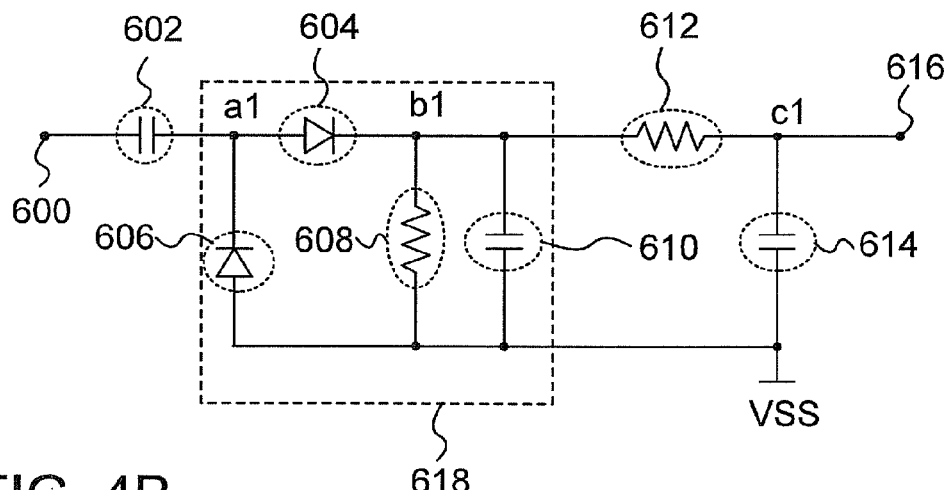
FIG. 4B
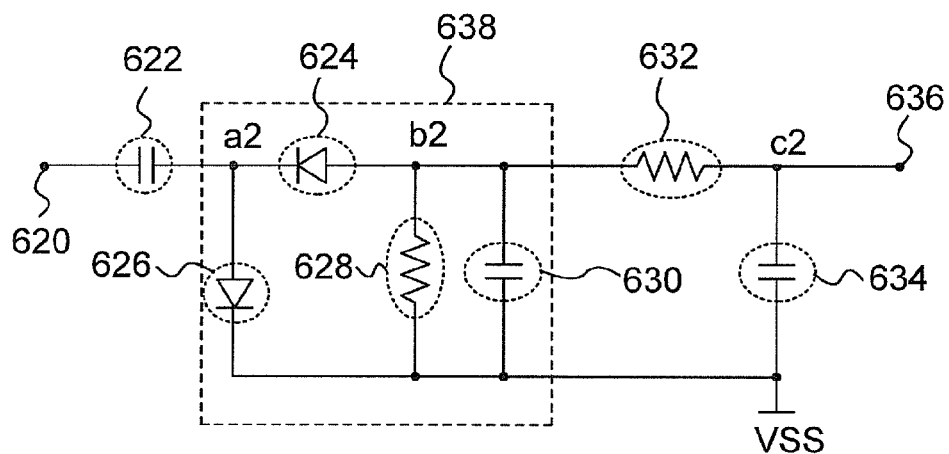
FIG. 4C
(C-1)　　　(C-2)　　　(C-3)
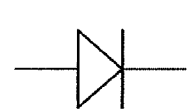 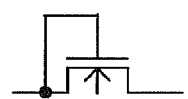 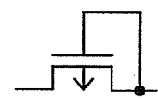

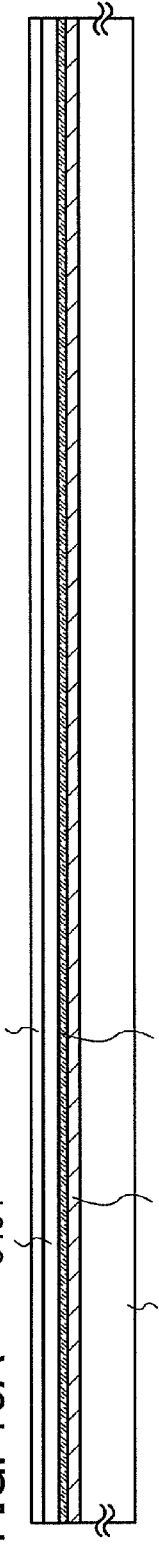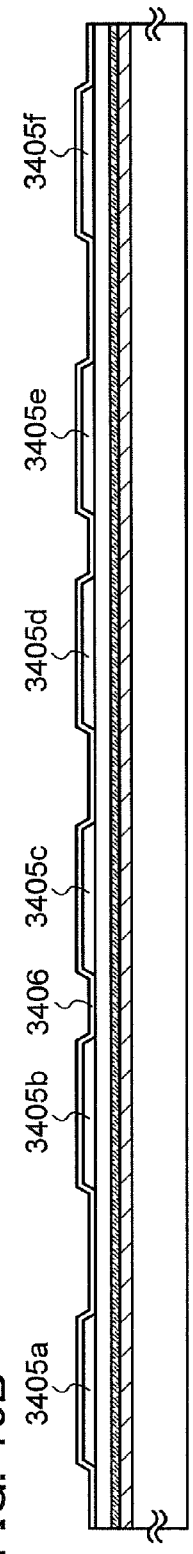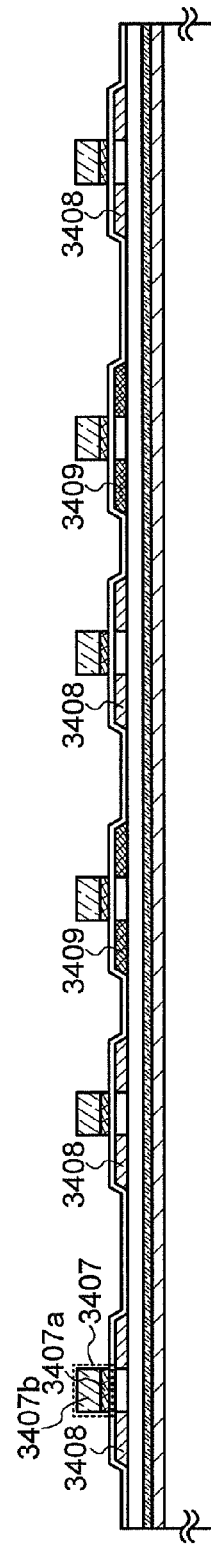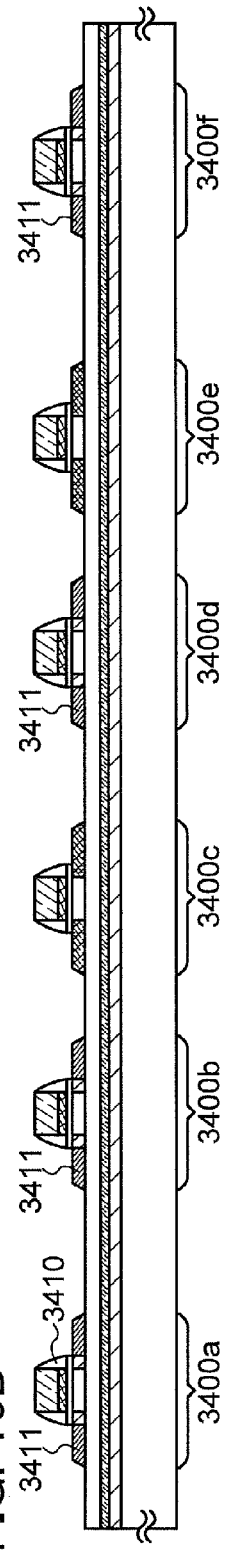

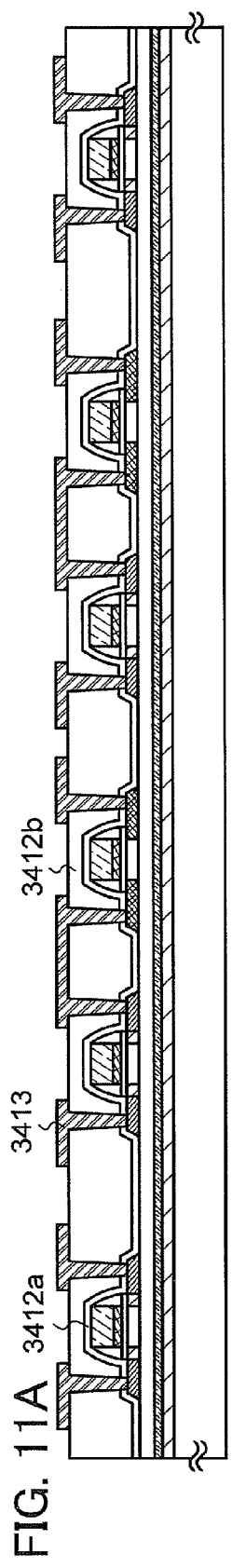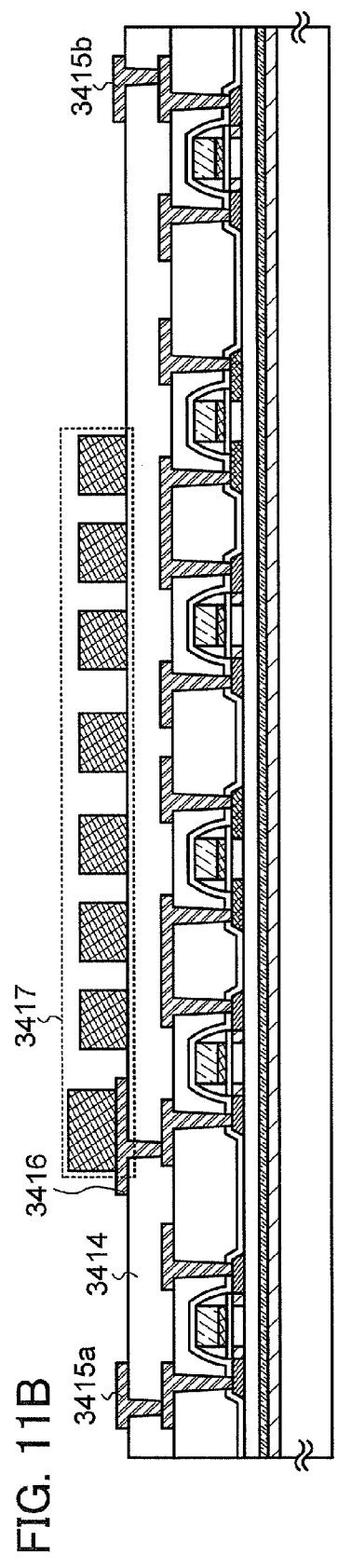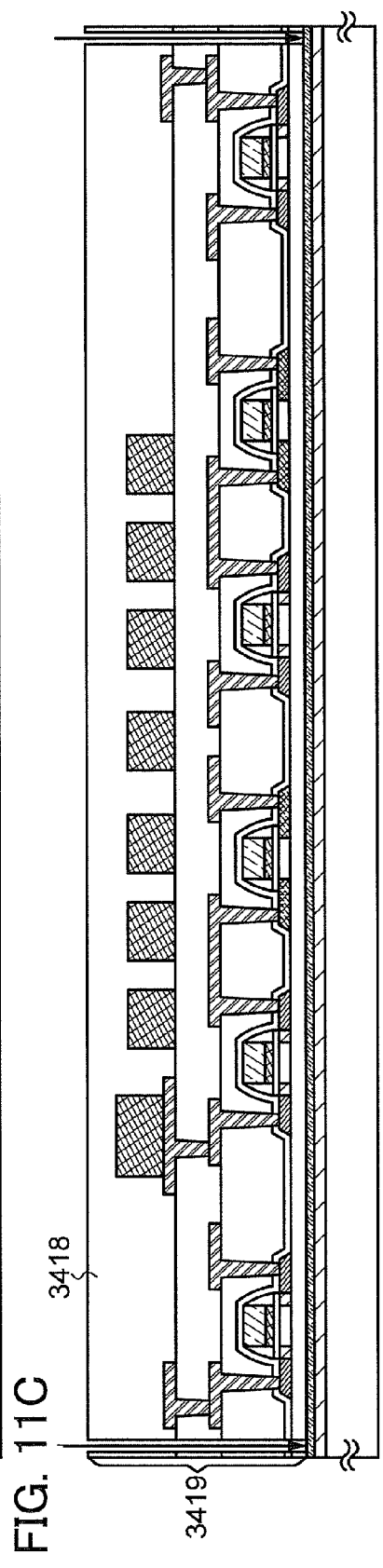

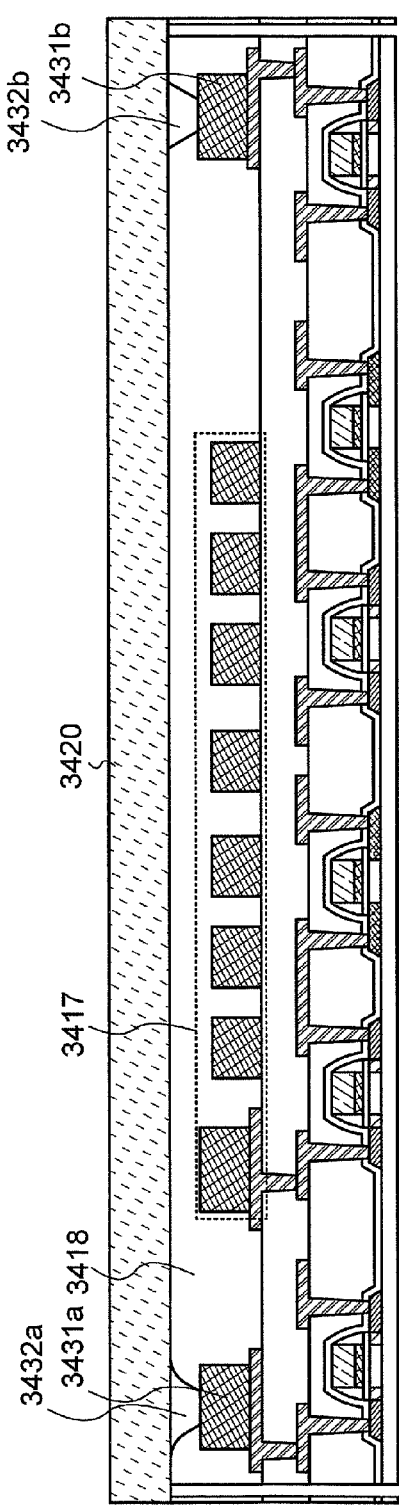
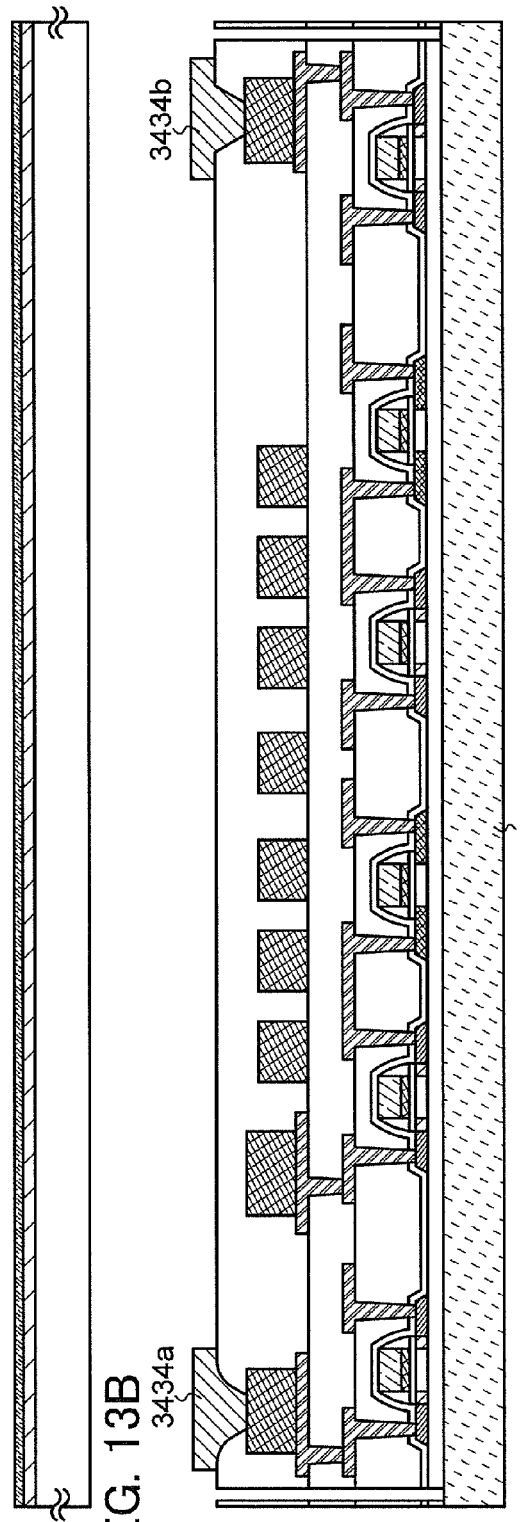
FIG. 13A
FIG. 13B

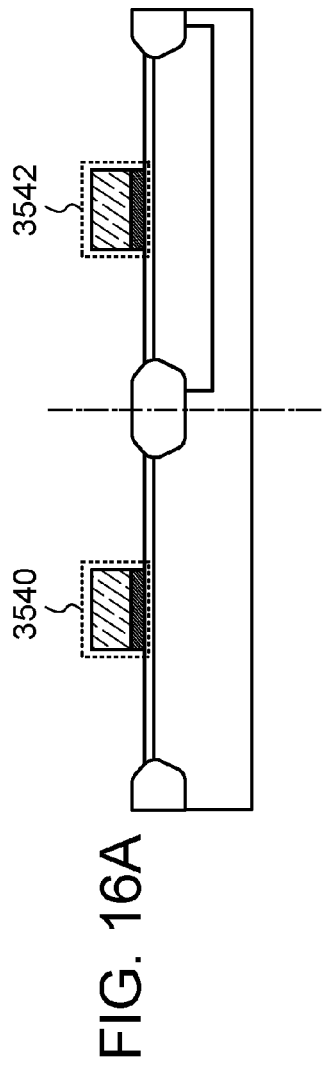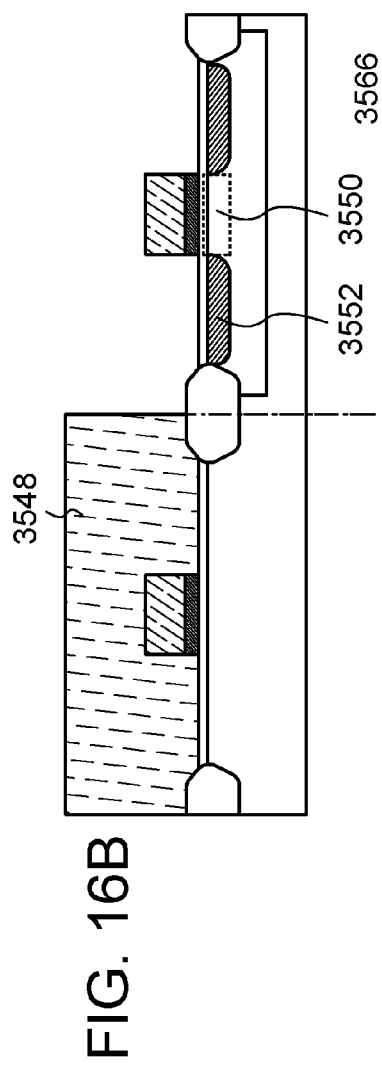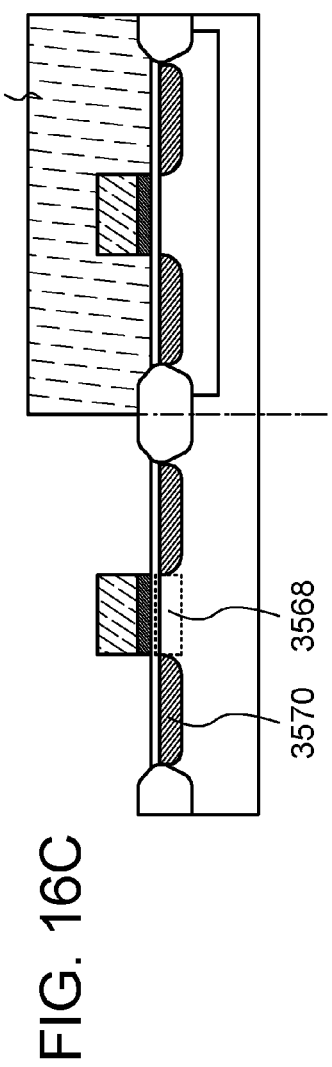

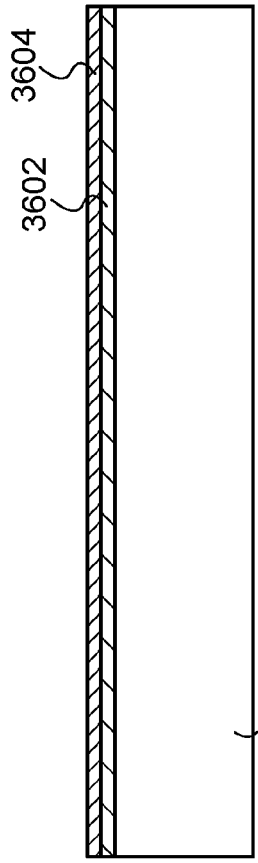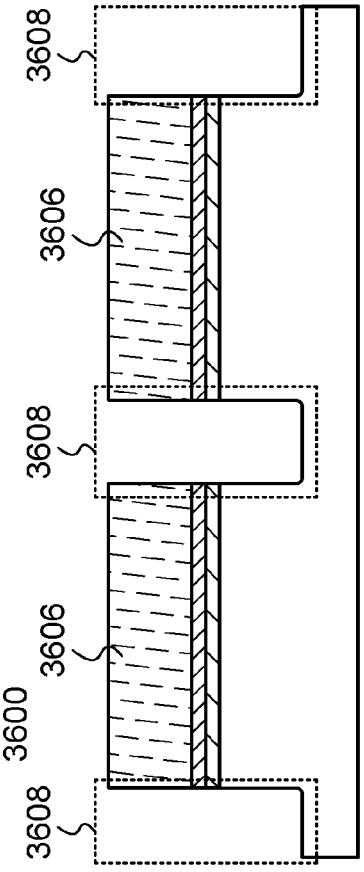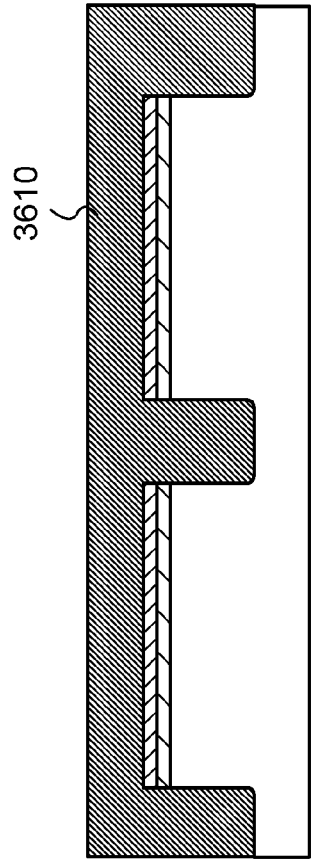

SEMICONDUCTOR DEVICE

BACKGROUND OF THE INVENTION

1. Field of the Invention

The present invention relates to a semiconductor device. In particular, the present invention relates to a semiconductor device capable of transmitting and receiving information without contact by utilizing wireless communication.

2. Description of the Related Art

In recent years, individual recognition technology in which individual identification information is given to an individual object to clarify information such as a history of the object has attracted attention. In particular, the development of semiconductor devices capable of transmitting and receiving data without contact by wireless communication through a radio wave has been advanced. Such semiconductor devices are referred to as an IC tag, an RFID tag, and the like, which have begun to be used for management of articles in markets, or the like.

In general, many of objects which are referred to as an RFID tag and the like that have been put into practical use include an element formation layer and an antenna layer having a circuit including a transistor or the like. Such semiconductor devices capable of wireless communication perform wireless communication with a reader/writer through an electromagnetic wave, so that the semiconductor devices can be operated by receiving power from a power source and data from the reader/writer. In wireless communication between the reader/writer and the semiconductor device, in general, a transmission side device (a reader/writer) transmits a modulated carrier wave and a reception side device (a semiconductor device) demodulates the carrier wave, so that data is extracted and information is transmitted and received.

In the semiconductor devices capable of wireless communication, there is an amplitude modulation method (an amplitude shift keying (ASK) modulation method) as one of methods which modulate a carrier wave. An ASK modulation method is a method which transmits information by generation of a difference in amplitude of a carrier wave and use of this amplitude difference as a modulation signal. Here, when an amplitude in a low state (a difference between a signal line (an amplitude peak) and a reference line (an amplitude center)) is a and an amplitude in a high state (a difference between a signal line (an amplitude peak) and a reference line (an amplitude center)) is b, a modulation factor m can be expressed as m=(b−a)/(b+a). The transmission side device decides a modulation factor by a method in accordance with both the transmission side device and the reception side device which perform wireless communication. The reception side device receives a modulation signal whose modulation factor is decided by the transmission side device, and demodulates the modulation signal.

However, since the semiconductor device capable of wireless communication includes an integrated circuit provided with a minute semiconductor element, a problem of variation or the like of element characteristics arises and it has been difficult to manufacture a semiconductor device having favorable electric characteristics. Thus, a semiconductor device having favorable electric characteristics has nearly been realized with various improvements (e.g., see Patent Document 1).

Note that the semiconductor device capable of wireless communication performs transmission, reception, and the like of a signal in accordance with a communication method based on various standards as communication thereof. With a communication method which is standardized with ISO/IEC 15693 which is a standard of a vicinity-type wireless IC card, a 13.56 MHz carrier wave is modulated in order to obtain a modulation factor of 100% or 10%, and data is encoded with a pulse position modulation method which identifies data by change of a modulation position of a pulse position. There are ISO/IEC 14443 (TYPE-A) and ISO/IEC 18000-3 as standards similar to ISO/IEC 15693. In ISO/IEC 14443 (TYPE-A), it is prescribed that a carrier wave whose modulation factor is 100% is expressed with an amplitude of which initial amplitude (an amplitude in a state without modulation of a signal) is less than or equal to 5%. Note that a communication frequency of these standards is decided 13.56 MHz. Further, various means can be considered in order to demodulate a signal whose modulation factor is 10% (e.g., see Patent Document 2 and Patent Document 3).

REFERENCE

Patent Document

[Patent Document 1] Japanese Published Patent Application No. 2006-268838
[Patent Document 2] Japanese Published Patent Application No. 2000-172806
[Patent Document 3] Japanese Published Patent Application No. 2008-182687

SUMMARY OF THE INVENTION

In general, a reception side device includes an analog circuit having a demodulation circuit, a power supply circuit, a modulation circuit, and the like, and a digital circuit connected to the analog circuit. As an output of the demodulation circuit, a demodulation signal is outputted from the analog circuit and inputted into the digital circuit.

FIG. 3 illustrates a circuit configuration of a general demodulation circuit which demodulates a carrier wave. A circuit of FIG. 3 includes a first diode, a second diode, a first resistor, a second resistor, a first capacitor, a second capacitor, and a third capacitor. In the circuit illustrated in FIG. 3, an input portion is connected to one end of the first capacitor. The other end of the first capacitor is connected to an anode (a first electrode) of the first diode and a cathode (a second electrode) of the second diode. A cathode (a second electrode) of the first diode is connected to one ends of the first resistor, the second resistor, and the second capacitor. An anode (a first electrode) of the second diode is grounded. The first resistor and the second capacitor are also grounded. The other end of the second resistor is connected to an output portion and one end of the third capacitor. The other end of the third capacitor is grounded.

Although the circuit illustrated in FIG. 3 can demodulate a carrier wave whose modulation factor is large (e.g., a carrier wave whose modulation factor is 100%), it is difficult to demodulate a carrier wave whose modulation factor is small (e.g., a carrier wave whose modulation factor is 10%). This is because, in the circuit illustrated in FIG. 3, an amplitude waveform is largely influenced by noise, which results from a carrier wave, on an amplitude waveform, and this influence cannot be disregarded when a modulation factor thereof is small (e.g., when the modulation factor is 10%). Therefore, the noise can be reduced by employment of a low-pass filter or the like for the demodulation circuit; however, the noise is not sufficiently reduced.

Thus, an embodiment of the present invention provides a semiconductor device having a circuit which can generate a demodulation signal (a demodulation signal generation circuit) without any problem also as to a modulation signal whose modulation factor is small (e.g., a signal whose modulation factor is 10%).

In order to solve the above problems, according to an embodiment of the present invention, a demodulation signal generation circuit includes a first demodulation circuit electrically connected to an antenna circuit; a second demodulation circuit which is electrically connected to the antenna circuit and which demodulates an electric signal having an opposite polarity to the first demodulation circuit; a first bias circuit having an input portion which is electrically connected to an output portion of the first demodulation circuit; a second bias circuit having an input portion which is electrically connected to an output portion of the second demodulation circuit; a comparator having a first input portion and a second input portion; an analog buffer circuit which is electrically connected to an output portion of the comparator; and a pulse detection circuit which is electrically connected to an output portion of the analog buffer circuit. In the demodulation signal generation circuit, an output portion of the first bias circuit is electrically connected to the first input portion, an output portion of the second bias circuit is electrically connected to the second input portion, and the pulse detection circuit is electrically connected to the first bias circuit and the second bias circuit.

Note that in the above structure, the pulse detection circuit may include an input portion, a first inverter circuit, a delay circuit, a buffer circuit, a NOR circuit, a first output portion, a second inverter circuit, and a second output portion.

Note that in the above structure, the polarities of signals which are outputted from the first output portion and the second output portion may be inverted.

Note that in the above structure, the analog buffer circuit may include a source follower circuit, a constant current circuit, and an inverter circuit.

The comparator may include any one of a differential circuit, a differential amplifier, or an operational amplifier, A semiconductor device having the above structure may include an antenna.

The antenna having the above structure may be annular or helical.

When the potential of a demodulation signal is inverted from HIGH to LOW, the potential of an output of the pulse detection circuit is inverted from LOW to HIGH. After that, the potential of the output of the pulse detection circuit remains at HIGH even when the potential of the demodulation signal is inverted from LOW to HIGH and then inverted from HIGH to LOW. When the potential of the demodulation signal returns to HIGH and does not change to LOW for a certain period of time, the potential of the output of the pulse detection circuit returns to LOW. When the potential of a signal of the pulse detection circuit is inverted to HIGH, the voltage level of an output signal of a bias circuit is changed. This prevents time change of demodulation signals in pulse width in such a manner that the voltage level of the first bias circuit and the voltage level of the second bias circuit approximate to each other. It is preferable that the voltage levels of the first bias circuit and the second bias circuit originally approximate to each other; however, demodulation signals have influence of noise when the voltage levels approximate to each other from the beginning. Therefore, the voltage levels approximate to each other in the middle of change in output voltage levels of the bias circuits. In an embodiment of the present invention, it is preferable to prevent time change of demodulation signals in such a manner that the output voltage levels of the bias circuits are changed.

According to an embodiment of the present invention, a demodulation signal of a modulation signal whose modulation factor is small (e.g., a modulation signal whose modulation factor is 10%) can be generated. Therefore, a semiconductor device capable of wireless communication can be operated even when the modulation signal whose modulation factor is small is used, and power from a power source is continuously supplied during reception of a wireless signal. Thus, the semiconductor device can be operated stably.

Further, in a semiconductor device according to an embodiment of the present invention, influence of noise which results from a carrier wave can be reduced; thus, a highly reliable demodulation signal can be generated stably.

Note that noise that exists in each of the outputs of the first bias circuit and the second bias circuit has the same phase. According to an embodiment of the present invention, a demodulation signal is generated by comparison of the outputs of the first bias circuit and the second bias circuit. Therefore, the noise of each of the outputs is cancelled, and influence of noise which results from a carrier wave is reduced; thus, a signal can be demodulated. Consequently, also as to a wireless signal whose modulation factor is small (e.g., a carrier wave whose modulation factor is 10%), the signal can be detected stably.

BRIEF DESCRIPTION OF THE DRAWINGS

In the accompanying drawings:

FIGS. 4A to 4C (4C-1 to 4C-3) illustrate a semiconductor device according to an embodiment of the present invention;

FIGS. 10A to 10D illustrate a method for manufacturing a semiconductor device to which an embodiment of the present invention is applied;

FIGS. 11A to 11C illustrate the method for manufacturing a semiconductor device to which an embodiment of the present invention is applied;

FIGS. 13A and 13B illustrate the method for manufacturing a semiconductor device to which an embodiment of the present invention is applied;

FIGS. 16A to 16C illustrate the method for manufacturing a semiconductor device to which an embodiment of the present invention is applied;

FIGS. 18A to 18C illustrate a method for manufacturing a semiconductor device to which an embodiment of the present invention is applied;

DETAILED DESCRIPTION OF THE INVENTION

Figure 1:
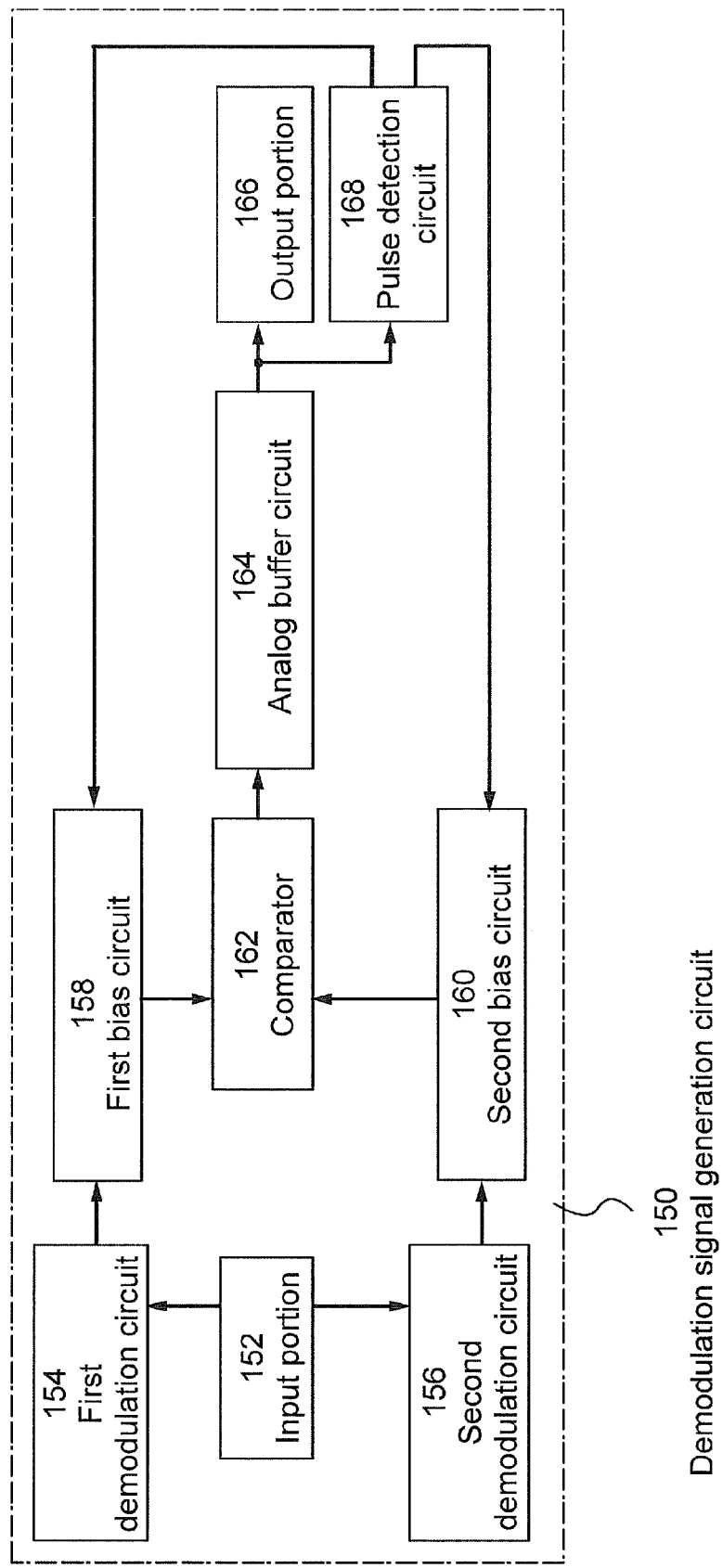
FIG. 1 illustrates a semiconductor device according to an embodiment of the present invention.

Embodiments of the present invention will be hereinafter described with reference to the accompanying drawings. However, the present invention can be implemented in various modes, and it is easily understood by those skilled in the art that modes and details thereof can be modified in various ways without departing from the spirit and the scope of the present invention. Therefore, the present invention should not be interpreted as being limited to the description of the embodiments below. Note that reference numerals denoting the same portions are used in common in different drawings in the structure of the present invention hereinafter described.

Embodiment 1

In one mode of this embodiment, an example of a structure of a semiconductor device having a demodulation signal generation circuit according to an embodiment of the present invention will be described with reference to drawings.

Figure 2:
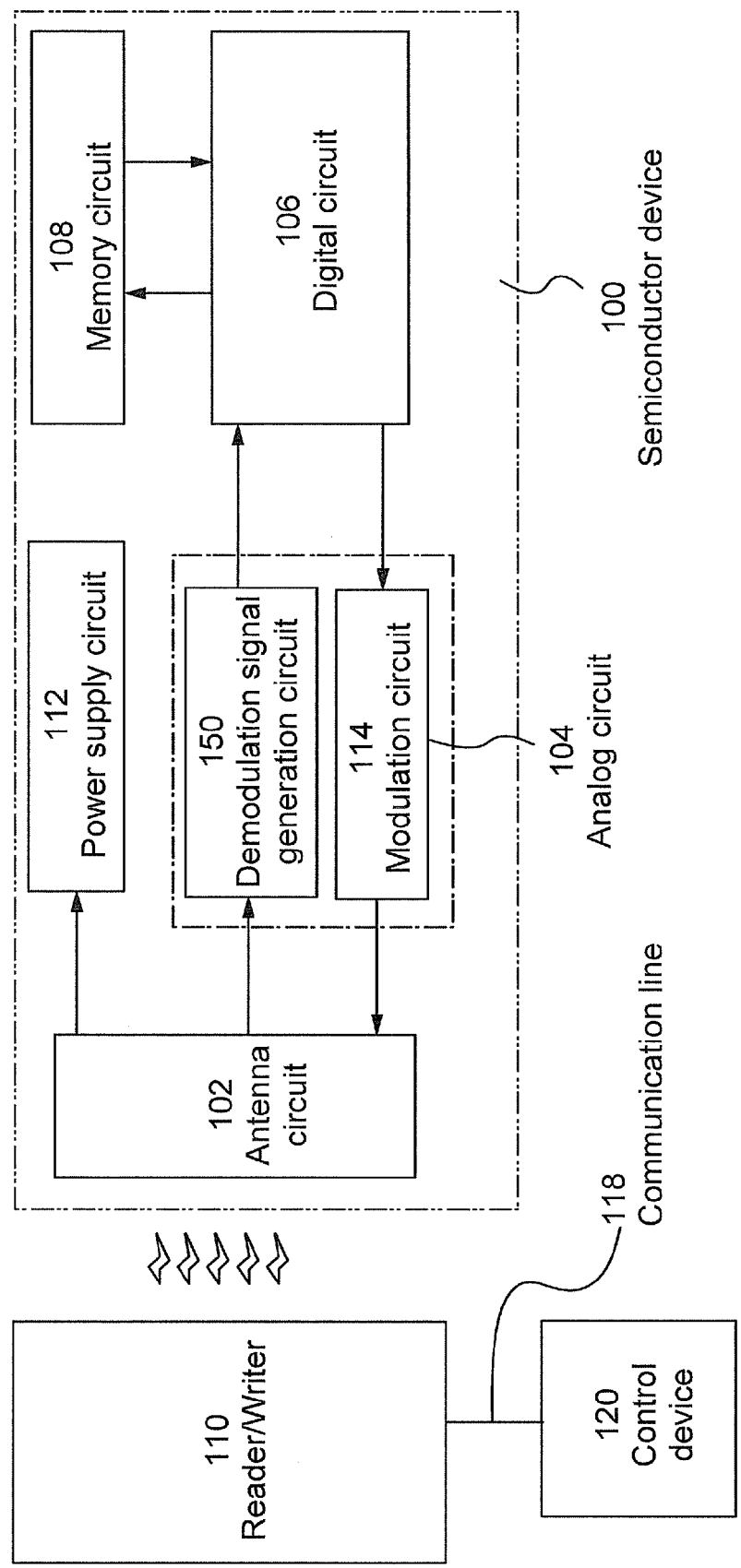
FIG. 2 illustrates a semiconductor device according to an embodiment of the present invention.

FIG. 2 illustrates a block diagram of a semiconductor device according to an embodiment of the present invention. A semiconductor device 100 according to an embodiment of the present invention transmits and receives data wirelessly to and from a reader/writer 110 by an electromagnetic wave. The reader/writer 110 is preferably connected to a control device 120 through a communication line 118. The control device 120 controls communication between the reader/writer 110 and the semiconductor device 100.

The semiconductor device 100 includes an antenna circuit 102, a power supply circuit 112, an analog circuit 104, a digital circuit 106 (including a control circuit), and a memory circuit 108. The analog circuit 104 has a demodulation signal generation circuit 150 and a modulation circuit 114. Alternatively, the semiconductor device 100 includes a wiring used to connect to an external antenna without having an antenna. The wiring and the external antenna may be connected to each other. In this case, the antenna which is separately manufactured is connected to the wiring. A connection terminal (a terminal electrode) which is electrically connected to the wiring may be used to connect the wiring and the antenna. Further, the semiconductor device 100 is not limited to the above structure, and may include a clock generation circuit, a central processor unit (hereinafter referred to as the CPU), or the like.

Note that the clock generation circuit refers to a circuit which generates and supplies to each circuit a clock signal having a frequency necessary for operations of the digital circuit 106, the memory circuit 108, and the like based on an AC induced voltage which is generated in the antenna circuit 102. An oscillation circuit or a frequency division circuit may be used for the clock generation circuit.

The antenna circuit 102, which preferably has an antenna and a rectifier circuit, receives an electromagnetic wave which is transmitted from the reader/writer 110, and generates an AC induced voltage. The induced voltage becomes power of the semiconductor device 100 and also includes data transmitted from the reader/writer 110.

The shape of the antenna that can be used for an embodiment of the present invention is not particularly limited. Therefore, a signal transmission method applied to the antenna circuit 102 included in the semiconductor device 100 can be an electromagnetic coupling method, an electromagnetic induction method, a radio wave method, or the like. The transmission method may be selected as appropriate by a practitioner in consideration of application use of the device. Thus, an antenna with an optimum length and shape may be provided in accordance with the transmission method. In an embodiment of the present invention, an electromagnetic induction method having a communication frequency of 13.56 MHz is preferably used as the signal transmission method.

In the case of applying an electromagnetic coupling method or an electromagnetic induction method (e.g., a 13.56 MHz band) as the transmission method, a conductive film which functions as the antenna is formed in an annular form (e.g., a loop antenna) or a helical form (e.g., a spiral antenna) in order to utilize electromagnetic induction that occurs with changes in electric field density.

In the case of using a microwave method (e.g., UHF band (860 MHz to 960 MHz), 2.45 GHz band, or the like) which is one kind of radio wave methods as the transmission method, the length and shape of the conductive film which functions as the antenna may be determined as appropriate in consideration of the wavelength of radio waves used for the signal transmission. For example, the conductive film which functions as the antenna may be formed in a linear form (e.g., a dipole antenna), a flat form (e.g., a patch antenna), or the like. Further, the shape of the conductive film which functions as the antenna is not limited to the linear form, and the conductive film may be provided in a curved form, a serpentine form, or a form combining them in consideration of the wavelength of the radio waves.

The power supply circuit 112 rectifies an induced voltage which is generated in the antenna circuit 102 by a diode or the like, and stabilizes the induced voltage with the use of a capacitor, thereby adjusting so as to maintain a stable potential having a certain potential difference from a reference potential (a potential of a reference line).

The digital circuit 106 performs the following operations based on a demodulated signal: analyzing instructions; controlling the memory circuit 108; outputting data for external transmission to the modulation circuit 114; and the like. The digital circuit 106 may include a decoding circuit, an information judging circuit, or the like, in addition to a generation circuit of a memory control signal. Further, the digital circuit 106 may include a circuit which converts part or all of data extracted from the memory circuit 108, which is transmitted from the semiconductor device 100 to the reader/writer 110, into an encoded signal.

The memory circuit 108 stores at least specific data (individual identification information) of the semiconductor device 100. The memory circuit 108 includes a control circuit which performs writing or reading of data in accordance with the digital circuit 106, and a circuit having a memory element.

The memory circuit 108 includes one or more of an organic memory, a dynamic random access memory (DRAM), a static random access memory (SRAM), a ferroelectric random access memory (FeRAM), a mask read-only memory (ROM), a programmable read only memory (PROM), an electrically programmable read only memory (EPROM), an electrically erasable programmable read only memory (EEPROM), and a flash memory. As long as the memory content of the memory circuit 108 is specific data (individual identification information or the like) of the semiconductor device 100, a nonvolatile memory which can store memory without being supplied with power is preferably used. On the other hand, as long as temporary memory used in processing performed by the semiconductor device 100 is stored, a volatile memory may be used. In particular, in the case of a so-called passive type in which the semiconductor device 100 has no battery, a nonvolatile memory is preferably used as the memory circuit 108.

The organic memory has a structure in which a layer containing an organic compound is sandwiched between a pair of conductive layers. It is also possible to use the organic memory for the memory circuit 108.

The modulation circuit 114 transmits load modulation to the antenna circuit 102 based on a signal from the digital circuit 106.

The demodulation signal generation circuit 150 demodulates and extracts data included in the induced voltage which is generated in the antenna circuit 102.

In the semiconductor device of this embodiment, an electromagnetic wave from the reader/writer is received and power by the electromagnetic wave is supplied to drive the semiconductor device. Therefore, although a passive-type semiconductor device is described in one mode of this embodiment, an embodiment of the present invention is not limited thereto. As a structure in which a battery is contained inside the semiconductor device, power may be supplied from a battery to drive the semiconductor device.

In the electromagnetic wave transmitted from the reader/writer, a carrier wave having a certain frequency is modulated from a sub-carrier wave. A signal included in the sub-carrier wave is a binarized digital signal which is transmitted to the semiconductor device from the reader/writer. As for a modulation method of the carrier wave, there are an amplitude shift keying (ASK) modulation method which changes amplitude, a frequency shift keying (FSK) modulation method which changes a frequency, and a phase shift keying (PSK) modulation method which changes a phase. One mode of this embodiment describes the case in which an electromagnetic wave modulated by the ASK modulation method is demodulated.

The demodulation signal generation circuit 150 included in the semiconductor device 100 according to an embodiment of the present invention is described with reference to FIG. 1. FIG. 1 illustrates a block diagram of the demodulation signal generation circuit 150 which can be used for one mode of this embodiment. The demodulation signal generation circuit 150 includes a first demodulation circuit 154, a second demodulation circuit 156, a first bias circuit 158, a second bias circuit 160, a comparator 162, an analog buffer circuit 164, and a pulse detection circuit 168. Although these circuits included in the demodulation signal generation circuit 150 are described below, an embodiment of the present invention is not limited thereto.

An input portion 152 of the demodulation signal generation circuit 150 illustrated in FIG. 1 is connected to an input portion 600 of the first demodulation circuit 154 and an input portion 620 of the second demodulation circuit 156. An output portion 616 of the first demodulation circuit 154 is connected to a first input portion 800 of the first bias circuit 158. An output portion 636 of the second demodulation circuit 156 is connected to a first input portion 820 of the second bias circuit 160. An output portion 812 of the first bias circuit 158 is connected to a first input portion 900A of the comparator 162. An output portion 832 of the second bias circuit 160 is connected to a second input portion 900B of the comparator 162. An output portion 912 of the comparator 162 is connected to an input portion 1000 of the analog buffer circuit 164. An output portion 1005 of the analog buffer circuit 164 is connected to an output portion 166 of the demodulation signal generation circuit 150 and an input portion 1101 of the pulse detection circuit 168. A first output portion 1106 of the pulse detection circuit 168 is connected to a second input portion 834 of the second bias circuit 160. A second output portion 1108 of the pulse detection circuit 168 is connected to a second input portion 814 of the first bias circuit 158.

FIGS. 4A and 4B illustrate an example of the configuration of the first demodulation circuit 154 and an example of the configuration of the second demodulation circuit 156, respectively. The first demodulation circuit 154 illustrated in FIG. 4A includes the input portion 600, the output portion 616, a first diode 604, a second diode 606, a first resistor 608, a second resistor 612, a first capacitor 602, a second capacitor 610, and a third capacitor 614. The input portion 600 is connected to one end of the first capacitor 602. The other end of the first capacitor 602 is connected to an anode of the first diode 604 and a cathode of the second diode 606. A cathode of the first diode 604 is connected to one ends of the first resistor 608, the second capacitor 610, and the second resistor 612. The other end of the second resistor 612 is connected to the output portion 616 and one end of the third capacitor 614. Further, an anode of the second diode 606, and the other ends of the first resistor 608, the second capacitor 610, and the third capacitor 614 are each connected to a reference potential ($V_{ss}$).

The second demodulation circuit 156 illustrated in FIG. 4B includes the input portion 620, the output portion 636, a first diode 624, a second diode 626, a first resistor 628, a second resistor 632, a first capacitor 622, a second capacitor 630, and a third capacitor 634. The input portion 620 is connected to one end of the first capacitor 622. The other end of the first capacitor 622 is connected to a cathode of the first diode 624 and an anode of the second diode 626. An anode of the first diode 624 is connected to one ends of the first resistor 628, the second capacitor 630, and the second resistor 632. The second resistor 632 is connected to the output portion 636 and one end of the third capacitor 634. Further, a cathode of the second diode 626, and the other ends of the first resistor 628, the second capacitor 630, and the third capacitor 634 are each connected to a reference potential ($V_{ss}$).

Figure 3:
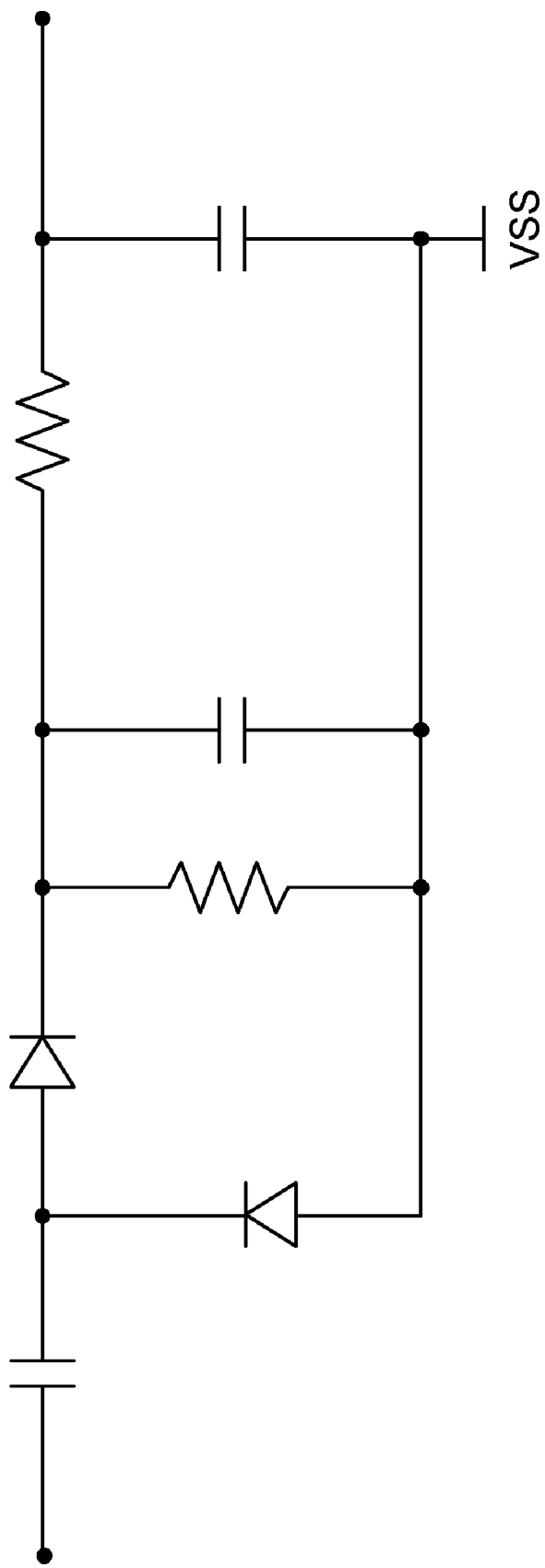
FIG. 3 illustrates a conventional semiconductor device.
Figure 5A:
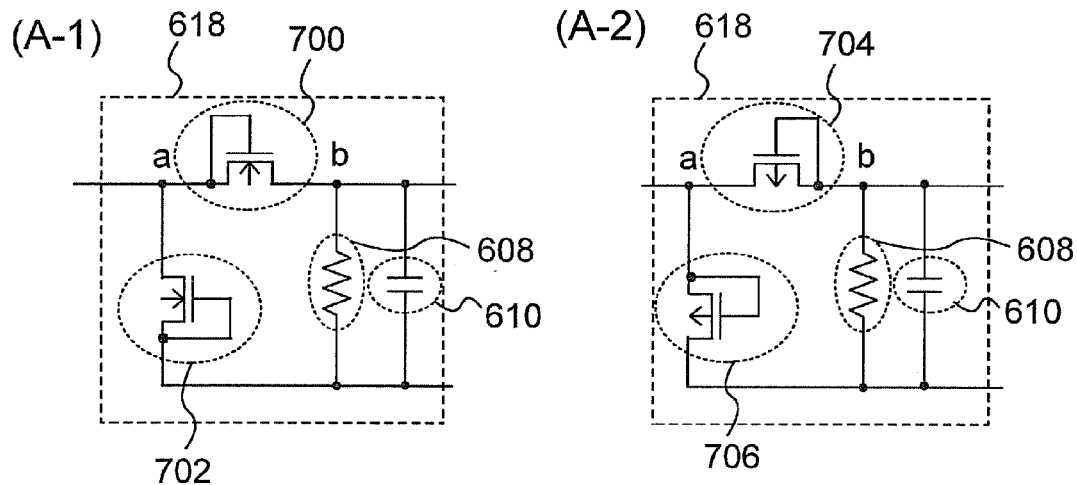
FIGS. 5A (5A-1 and 5A-2) and 5B (5B-1 and 5B-2) illustrate a semiconductor device according to an embodiment of the present invention.

Each of the first diode 604, the second diode 606, the first diode 624, and the second diode 626 of FIGS. 4A and 4B may be formed using a diode-connected TFT. A diode illustrated in FIG. 4C-1, a diode-connected n-type TFT illustrated in FIG. 4C-2, and a diode-connected p-type TFT illustrated in FIG. 4C-3 are equivalent as a circuit. FIG. 5A (5A-1 and 5A-2) each illustrate an example in which a circuit 618 which is part of the first demodulation circuit 154, which is illustrated in FIG. 4A, is formed using any of the TFTs illustrated in FIG. 4C (4C-1 to 4C-3). Similarly, FIG. 5B (5B-1 and 5B-2) illustrate examples in which a circuit 638 which is part of the second demodulation circuit 156 illustrated in FIG. 4B is formed using the TFTs illustrated in FIG. 4C (4C-2 and 4C-3). In the circuit illustrated in FIG. 5A-1, an n-type TFT 700 and an n-type TFT 702 are used as diode-connected TFTs. In the circuit illustrated in FIG. 5A-2, a p-type TFT 704 and a p-type TFT 706 are used as diode-connected TFTs. In the circuit illustrated in FIG. 5B-1, an n-type TFT 708 and an n-type TFT 710 are used as diode-connected TFTs. In the circuit illustrated in FIG. 5B-2, a p-type TFT 712 and a p-type TFT 714 are used as diode-connected TFTs.

Figure 5B:
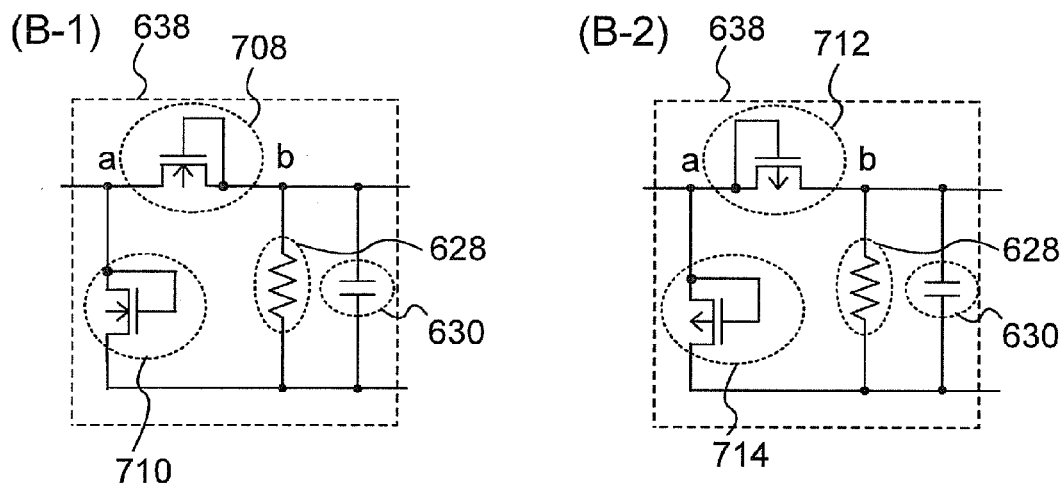

The first demodulation circuit 154 and the second demodulation circuit 156 may be formed by combination of the circuits illustrated in FIGS. 4A to 4C (4C-1 to 4C-3) and FIGS. 5A (5A-1 and 5A-2) and 5B (5B-1 and 5B-2). The first demodulation circuit 154 having the circuit 618 illustrated in FIG. 5A-1 and the second demodulation circuit 156 having the circuit 638 illustrated in FIG. 5B-2 may be used, or the first demodulation circuit 154 having the circuit 618 illustrated in FIG. 5A-2 and the second demodulation circuit 156 having the circuit 638 illustrated in FIG. 5B-1 may be used. Alternatively, the first demodulation circuit 154 having the circuit 618 illustrated in FIG. 5A-2 and the second demodulation circuit 156 having the circuit 638 illustrated in FIG. 5B-2 may be used. Preferably, the circuit 618 illustrated in FIG. 5A-1 is used for the first demodulation circuit 154, and the circuit 638 illustrated in FIG. 5B-1 is used for the second demodulation circuit 156. In general, an n-type TFT has higher carrier mobility than a p-type TFT. Therefore, n-type TFTs are used for all TFTs included in the first demodulation circuit and the second demodulation circuit, so that operation performance of the circuits can be improved.

The first capacitor 602 (or the first capacitor 622) is provided to compensate center of a wave amplitude (a reference line). The first resistor 608 (or the first resistor 628) is provided to make constant current flowing through a point b1 (or a point b2). Further, the second capacitor 610 (or the second capacitor 630) is provided to smooth a waveform. The resistance value of the first resistor 608 (or the first resistor 628) is adjusted as appropriate depending on the degree of electrostatic capacitance of the second capacitor 610 (or the second capacitor 630). When the resistance value of the first resistor 608 (or the first resistor 628) is small, an amplitude of the carrier wave is reduced; and when the resistance value is excessive, a breakdown phenomenon of the second diode 606 (or the second diode 626) occurs; thus, the semiconductor device does not operate normally. Furthermore, the second resistor 612 (or the second resistor 632) and the third capacitor 614 (or the third capacitor 634) function as a low-pass filter which removes a high-frequency component.

Figure 6A:
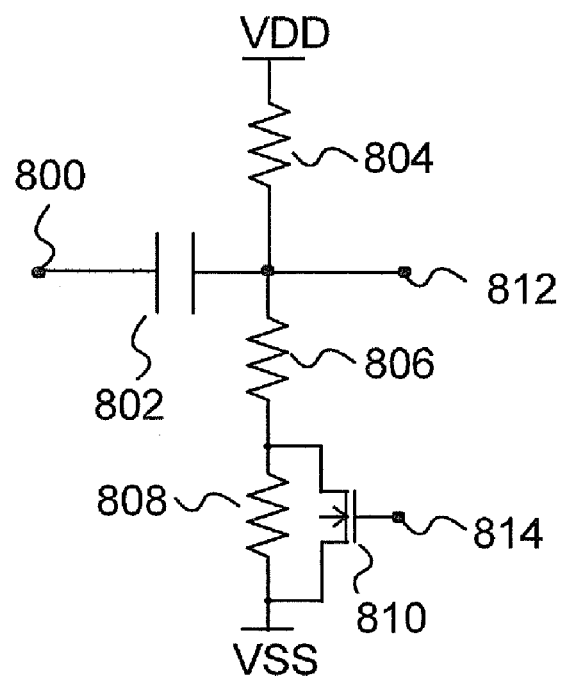
FIGS. 6A and 6B illustrate a semiconductor device according to an embodiment of the present invention.
Figure 6B:
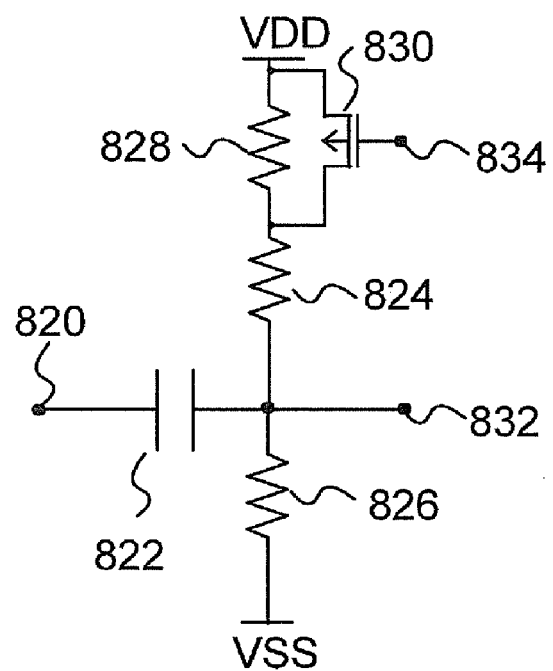

FIGS. 6A and 6B illustrate an example of the configuration of the first bias circuit 158 and an example of the configuration of the second bias circuit 160, respectively. In the first bias circuit 158 illustrated in FIG. 6A, the first input portion 800 is connected to one end of a capacitor 802, and the other end of the capacitor 802 is connected to the output portion 812, and one ends of a first resistor 804 and a second resistor 806. The other end of the first resistor 804 is connected to a power source potential ($V_{dd}$). The other end of the second resistor 806 is connected to one end of a third resistor 808 and one of a source electrode and a drain electrode of a first TFT 810. The other end of the third resistor 808 and the other of the source electrode and the drain electrode of the first TFT 810 are each connected to a reference potential ($V_{ss}$). A gate electrode of the first TFT 810 is connected to the second input portion 814.

The capacitor 802 is provided to isolate the first input portion 800 galvanically from the power source potential to which the first resistor 804 is connected.

The first resistor 804, the second resistor 806, the third resistor 808, and the first TFT 810 are provided to generate a difference between potentials of signals which are inputted into the first input portion 900A included in the comparator 162.

When the first TFT 810 is off, current which flows from the second resistor 806 flows not through the first TFT 810 but through the third resistor 808. When the resistance value of the first resistor 804 is $R_{1A}$, the resistance value of the second resistor 806 is $R_{2A}$, and the resistance value of the third resistor 808 is $R_{3A}$, a voltage level $V_A$ of the output portion 812 is as follows:

$$V_A = V_{dd} \times (R_{2A} + R_{3A}) / (R_{1A} + R_{2A} + R_{3A})$$

In the case where the first TFT 810 is on, the current which flows from the second resistor 806 flows through the first TFT 810 and the third resistor 808. When the current flows through the first TFT 810, as to a resistance value $R_{4A}$ between the drain electrode and the source electrode of the first TFT 810, $R_{4A} = R_{TA}$ is obtained when an on resistor of the first TFT 810 and the third resistor 808 are connected in parallel and $R_T \ll R_3$ is satisfied. The voltage level $V_A$ of the output portion 812 is as follows:

$$V_A = V_{dd} \times (R_{2A} + R_{4A}) / (R_{1A} + R_{2A} + R_{4A})$$

However, when $R_{1A} \gg R_{4A}$ and $R_{2A} \gg R_{4A}$ are satisfied, the following is obtained:

$$V_A = V_{dd} \times R_{2A} / (R_{1A} + R_{2A})$$

The first TFT 810 is turned on or off with signals from the second input portion 814, so that the voltage level $V_A$ of the output portion 812 can be changed.

In the second bias circuit 160 illustrated in FIG. 6B, the first input portion 820 is connected to one end of a capacitor 822, and the other end of the capacitor 822 is connected to the output portion 832, and one ends of a first resistor 824 and a second resistor 826. The other end of the second resistor 826 is connected to a reference potential ($V_{ss}$). The other end of the first resistor 824 is connected to one end of a third resistor 828 and one of a source electrode and a drain electrode of a first TFT 830. The other end of the third resistor 828 and the other of the source electrode and the drain electrode of the first TFT 830 are each connected to a power source potential ($V_{dd}$). A gate electrode of the first TFT 830 is connected to the second input portion 834.

The capacitor 822 is provided to isolate the first input portion 820 galvanically from the power source potential to which the first resistor 824 is connected.

The first resistor 824, the second resistor 826, the third resistor 828, and the first TFT 830 are provided to generate a difference between potentials of signals which are inputted into the second input portion 900B included in the comparator 162.

When the first TFT 830 is off, current which flows from the second resistor 824 flows not through the first TFT 830 but through the third resistor 828. When the resistance value of the first resistor 824 is $R_{1B}$, the resistance value of the second resistor 826 is $R_{2B}$, and the resistance value of the third resistor 828 is $R_{3B}$, a voltage level $V_B$ of the output portion 832 is as follows:

$$V_B = V_{dd} \times (R_{2B} + R_{3B}) / (R_{1B} + R_{2B} + R_{3B})$$

When the first TFT 830 is on, current flows through the second resistor 826 from the first TFT 830 and the third resistor 828. When the current flows through the first TFT 830, as to a resistance value $R_{4B}$ between the drain electrode and the source electrode of the first TFT 830, $R_{4B} = R_{TB}$ is obtained when an on resistor of the first TFT 830 and the third resistor 828 are connected in parallel and $R_T \ll R_3$ is satisfied. The voltage level $V_B$ of the output portion 832 is as follows:

$$V_B = V_{dd} \times (R_{2B} + R_{4B})/(R_{1B} + R_{2B} + R_{4B})$$

However, when $R_{1B} \gg R_{4B}$ and $R_{2B} \gg R_{4B}$ are satisfied, the following is obtained:

$$V_B = V_{dd} \times R_{2B}/(R_{1B} + R_{2B})$$

The first TFT 830 is turned on or off with signals from the second input portion 834, so that the voltage level $V_B$ of the output portion 832 can be changed.

Malfunction in the comparator 162 can be prevented by inclusion of the first bias circuit 158 and the second bias circuit 160.

Figure 7:
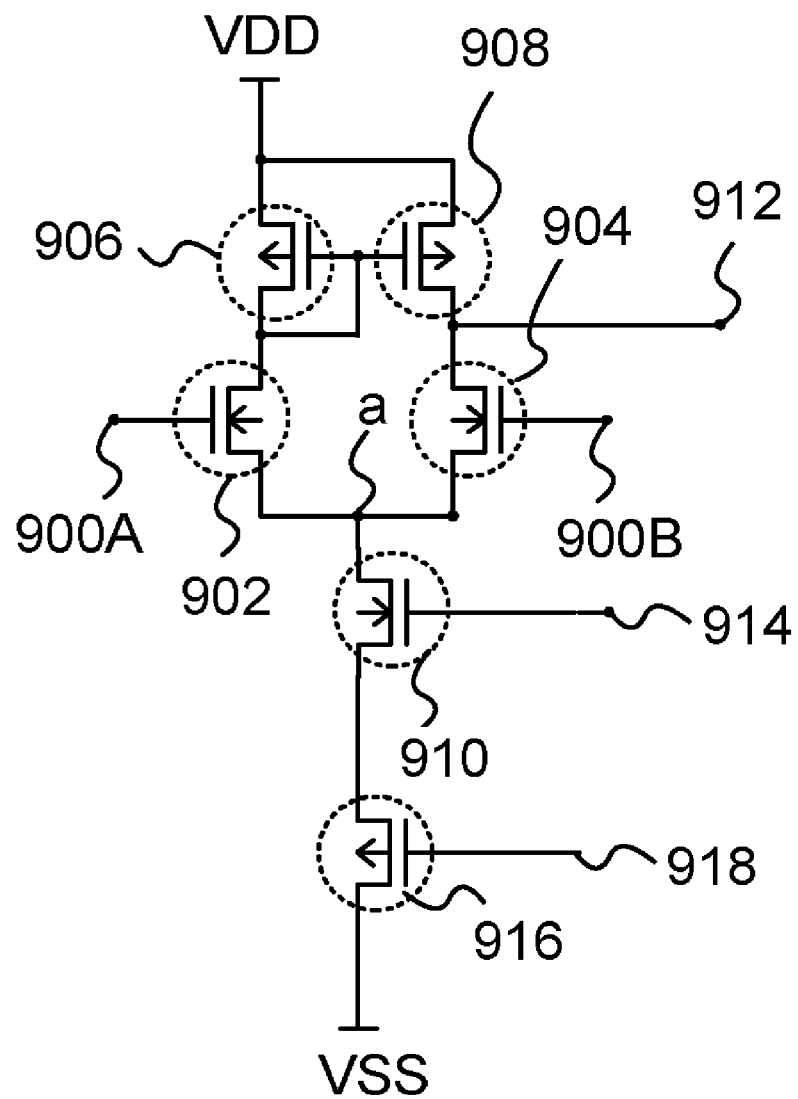
FIG. 7 illustrates a semiconductor device according to an embodiment of the present invention.

FIG. 7 illustrates an example of a configuration of the comparator 162. The comparator 162 includes two input portions such as a differential circuit, a differential amplifier, or an operational amplifier, and a circuit having a function to compare signals inputted into the input portions can be used. The comparator 162 includes at least the first input portion 900A, the second input portion 900B, a first TFT 902, a second TFT 904, a third TFT 906, a fourth TFT 908, a fifth TFT 910, and a first output portion 912. In the comparator 162, the first input portion 900A is connected to an output portion 808A of the first bias circuit 158, and the second input portion 900B is connected to an output portion 808B of the second bias circuit 160. The first input portion 900A is connected to a gate electrode of the first TFT 902, and the second input portion 900B is connected to a gate electrode of the second TFT 904. One of a source electrode and a drain electrode of the first TFT 902 is connected to one of a source electrode and a drain electrode of the fifth TFT 910 and one of a source electrode and a drain electrode of the second TFT 904. The other of the source electrode and the drain electrode of the first TFT 902 is connected to one of a source electrode and a drain electrode of the third TFT 906, a gate electrode of the third TFT 906, and a gate electrode of the fourth TFT 908. The other of the source electrode and the drain electrode of the third TFT 906 is connected to a power source potential ($V_{dd}$). One of a source electrode and a drain electrode of the fourth TFT 908 is connected to the power source potential ($V_{dd}$). The other of the source electrode and the drain electrode of the fourth TFT 908 is connected to the output portion 912 and the other of the source electrode and the drain electrode of the second TFT 904. A gate electrode of the fifth TFT 910 is connected to a constant current circuit 1003 through a wiring 914. The other of the source electrode and the drain electrode of the fifth TFT 910 is connected to a reference potential ($V_{dd}$). Note that the wiring 914 is connected to the constant current circuit 1003. In FIG. 7, in one mode of this embodiment, a sixth TFT 916 is constantly turned on or not provided.

Operation when a signal is inputted into the first input portion 900A and the second input portion 900B of the comparator 162 is described.

A current which flows through the fifth TFT 910 which is a constant current source of the comparator 162 is set $I_d$. Here, since the third TFT 906 and the fourth TFT 908 form a current mirror circuit, a current of $I_d/2$ flows between the source electrode and the drain electrode of each of the third TFT 906 and the fourth TFT 908. In addition, a potential of a point a illustrated in FIG. 7 is set $V_5$.

Here, the case where a different potential is applied to two TFTs which form a differential pair is described. First, the case where a potential of the first input portion 900A is higher than a potential of the second input portion 900B is considered. A current which flows through the first TFT 902 and the second TFT 904 is expressed in the following formula (I). Here, $V_{gs}$ is a gate voltage; $V_{ds}$, a drain voltage; $V_{th}$, a threshold voltage; k, a transconductance coefficient; and λ, a channel length modulation coefficient.

[FORMULA 1]

$$I_{ds} = \frac{I_d}{2} = k(V_{gs} - V_{th})^2 (1 + \lambda \cdot V_{ds}) \quad (1)$$

Since a potential of the first input portion 900A is higher than a potential of the second input portion 900B in the formula (1), the following relation is formed between $V_{gs}$ (902) which is the gate voltage of the first TFT 902 and $V_{gs}$ (904) which is the gate voltage of the second TFT 904: $V_{gs}$ (902)$>V_{gs}$ (904). The transconductance coefficient k is a value unique (a constant) to a TFT which is determined by a carrier mobility, a capacitance of a gate insulating film, a channel width, and a channel length of a TFT, and the channel length modulation coefficient λ is a constant which is determined by manufacturing processes of a TFT. Therefore, when the transconductance coefficients k and the channel length modulation coefficients λ of the first TFT 902 and the second TFT 904 are equivalent, the following relation is formed between the drain voltage $V_{ds}$ of the first TFT 902 and the drain voltage $V_{ds}$ of the second TFT 904: $V_{ds}$(902)$<V_{ds}$(904). Next, when the case where a potential of the first input portion 900A is lower than a potential of the second input portion 900B is considered similarly to the above case, the following relation is formed between the drain voltage $V_{ds}$ of the first TFT 902 and the drain voltage $V_{ds}$ of the second TFT 904: $V_{ds}$(902)$>V_{ds}$(904).

As described above, the voltage of the output portion 912 fluctuates depending on the magnitude relation of potentials of the first input portion 900A and the second input portion 900B.

Figure 8A:
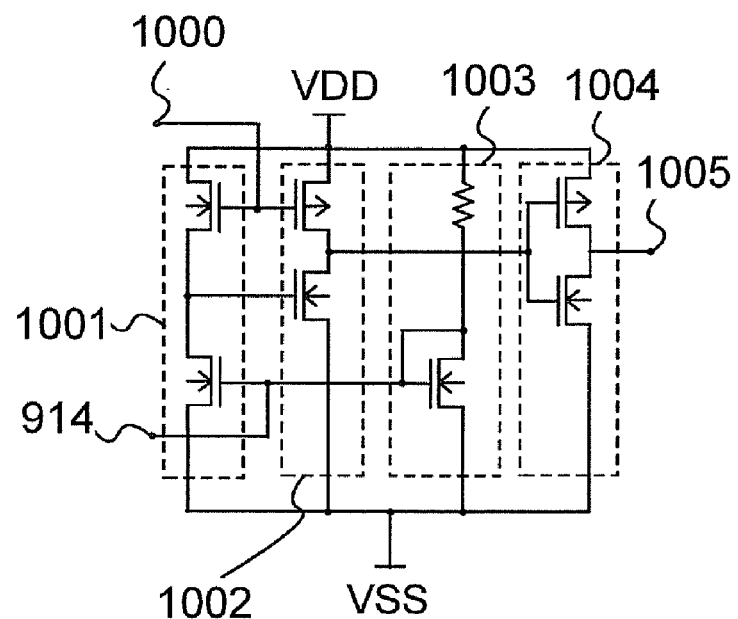
FIGS. 8A and 8B illustrate a semiconductor device according to an embodiment of the present invention.
Figure 8B:
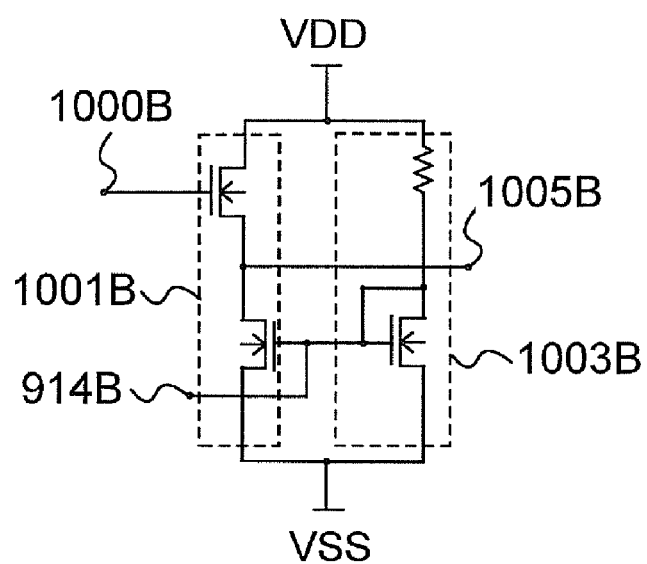

Next, FIGS. 8A and 8B each illustrate an example of the circuit configuration of the analog buffer circuit 164. An analog buffer circuit of FIG. 8A includes the input portion 1000, the wiring 914, a source follower circuit 1001, an inverter circuit 1002, the constant current circuit 1003, an inverter circuit 1004, and the output portion 1005. The wiring 914 is connected to the gate electrode of the fifth TFT 910 illustrated in FIG. 7. The output portion 1005 is connected to the output portion 166 of the demodulation signal generation circuit 150.

An analog buffer circuit of FIG. 8B includes an input portion 1000B, a wiring 914B, a source follower circuit 1001B, a constant current circuit 1003B, and an output portion 1005B. The wiring 914B is connected to the gate electrode of the fifth TFT 910 illustrated in FIG. 7. The output portion 1005B is connected to the output portion 166 of the demodulation signal generation circuit 150.

Noise can be removed more effectively and a demodulation signal can be generated stably by provision of the analog buffer circuit 164 as illustrated in FIG. 8A or 8B.

Figure 9:
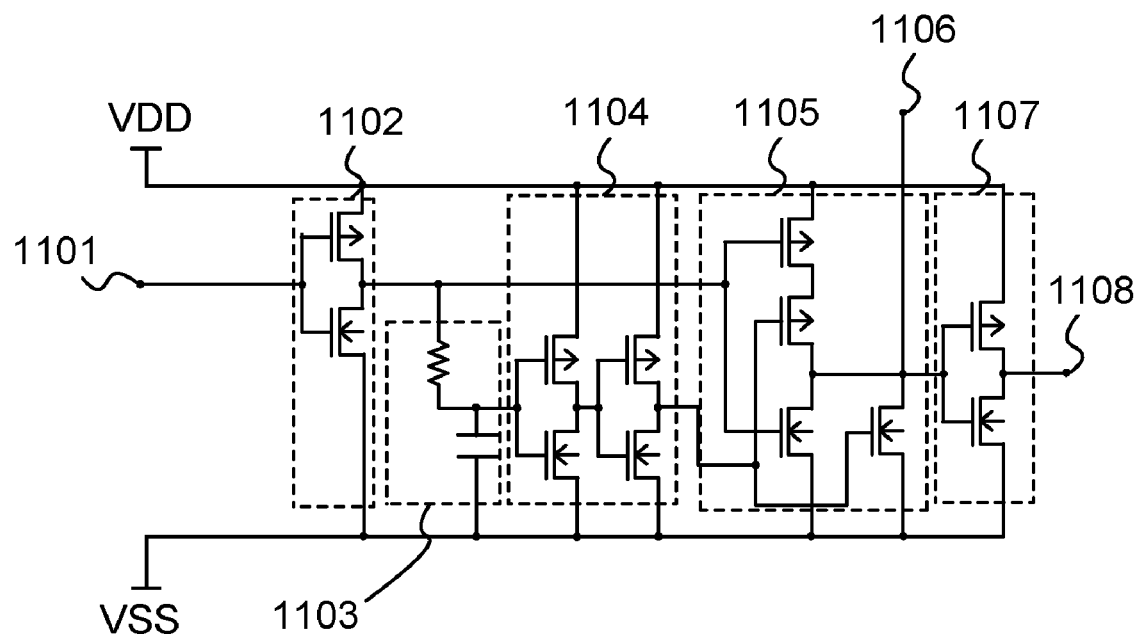
FIG. 9 illustrates a semiconductor device according to an embodiment of the present invention.

FIG. 9 illustrates an example of the configuration of the pulse detection circuit 168. A pulse detection circuit of FIG. 9 includes the input portion 1101, an inverter circuit 1102, a delay circuit 1103, a buffer circuit 1104, a NOR circuit 1105, the first output portion 1106, an inverter circuit 1107, and the second output portion 1108. The first output portion 1106 is connected to the second input portion 834 illustrated in FIG. 6B. The second output portion 1108 is connected to the second input portion 814 illustrated in FIG. 6A.

When a demodulation pulse signal is detected in the pulse detection circuit, a signal is outputted.

A demodulated signal is inputted into the digital circuit 106, individual identification information or the like stored in the memory circuit 108 by the digital circuit 106 is extracted, and the extracted information is encoded in the digital circuit 106 and inputted into the modulation circuit 114. The modulation circuit 114 performs modulation in accordance with the inputted signal, and transmits information from the antenna circuit 102 to the reader/writer 110. The information received in the reader/writer 110 is transmitted to the control device 120 through the communication line 118.

As described above, with the use of a semiconductor device according to an embodiment of the present invention, a modulation signal whose modulation factor is small can be demodulated stably and thus information can be received. Specifically, the modulation signal can be demodulated by detection of a difference between a signal line and a reference line and data thereof can be extracted stably.

Further, noise of the signal line and noise of the reference line have the same phase. As for the demodulation method of the present invention, demodulation is performed by comparison of the signal line and the reference line; therefore, the noise of each line is canceled because of the same phase. Through the above reasons, the semiconductor device according to an embodiment of the present invention can perform demodulation having less influence of noise due to a carrier wave.

Embodiment 2

In one mode of this embodiment, an example of a manufacturing method of the semiconductor device described in Embodiment 1 will be described with reference to drawings. In one mode of this embodiment, a structure of the semiconductor device in which an antenna, a battery, and a signal processing circuit are formed over one substrate using a thin film transistor will be described. Note that miniaturization can be achieved by formation of an antenna, a battery, and a signal processing circuit over one substrate. Further, an example in which a thin film secondary battery is used as the battery will be described.

First, a separation layer 3403 is formed over one surface of a substrate 3401 with an insulating film 3402 interposed therebetween, and then an insulating film 3404 which functions as a base film and an amorphous semiconductor film 3405 (e.g., a film containing amorphous silicon) are stacked thereover (see FIG. 10A). Note that the insulating film 3402, the separation layer 3403, the insulating film 3404, and the semiconductor film 3405 can be formed successively. Note that the separation layer 3403 does not have to be formed when separation is not necessary.

The substrate 3401 is selected from a glass substrate, a quartz substrate, a metal substrate (e.g., a stainless steel substrate or the like), a ceramic substrate, a semiconductor substrate such as a silicon substrate, or the like. Alternatively, a plastic substrate formed using polyethylene terephthalate (PET), polyethylene naphthalate (PEN), polyether sulfone (PES), acrylic, or the like may be used. Note that the separation layer 3403 is provided over the entire surface of the substrate 3401 with the insulating film 3402 interposed therebetween in this step; however, a pattern may be formed by a photolithography method after the separation layer is provided over the entire surface of the substrate 3401.

The insulating film 3402 and the insulating film 3404 are formed using an insulating material such as silicon oxide, silicon nitride, silicon oxynitride ($SiO_xN_y$, where x>y), or silicon nitride oxide ($SiN_xO_y$, where x>y) by a CVD method, a sputtering method, or the like. For example, when each of the insulating film 3402 and the insulating film 3404 is formed to have a two-layer structure, a silicon nitride oxide film may be formed as a first insulating film and a silicon oxynitride film may be formed as a second insulating film. Alternatively, a silicon nitride film may be formed as the first insulating film and a silicon oxide film may be formed as the second insulating film. The insulating film 3402 functions as a blocking layer which prevents an impurity element contained in the substrate 3401 from being mixed into the separation layer 3403 or elements formed thereover. The insulating film 3404 functions as a blocking layer which prevents an impurity element contained in the substrate 3401 and the separation layer 3403 from being mixed into an element formed over the insulating film 3404. In such a manner, the insulating film 3402 and the insulating film 3404 which function as the blocking layers are formed, so that adverse effects on the elements formed thereover, which would otherwise be caused by an alkali metal such as sodium or an alkaline earth metal contained in the substrate 3401 and by the impurity element contained in the separation layer 3403 can be prevented. Note that the insulating film 3402 and the insulating film 3404 may be omitted in such a case where quartz is used as the substrate 3401. This is because an alkaline metal and an alkaline earth metal are not contained in a quartz substrate.

The separation layer 3403 can be formed using a metal film, a stacked structure of a metal film and a metal oxide film, or the like. The metal film is formed as a single layer or stacked layers of a film formed using an element selected from tungsten, molybdenum, titanium, tantalum, niobium, nickel, cobalt, zirconium, zinc, ruthenium, rhodium, palladium, osmium, or iridium, or an alloy material or a compound material containing the elements as its main component. Further, such materials can be formed by a sputtering method, various CVD methods such as a plasma CVD method, or the like. A stacked structure or a metal film and a metal oxide film can be obtained in such a manner that, after the above-described metal film is formed, plasma treatment thereto is performed under an oxygen atmosphere or an $N_2O$ atmosphere or heat treatment thereto is performed under an oxygen atmosphere or an $N_2O$ atmosphere, and thus oxide or oxynitride of the metal film is formed on the metal film surface. For example, when a tungsten film is provided as the metal film by a sputtering method, a CVD method, or the like, a metal oxide film formed using tungsten oxide can be formed on the surface of the tungsten film by subjecting the tungsten film to plasma treatment. In addition thereto, for example, after a metal film (e.g., a tungsten film) is formed, an insulating film formed using silicon oxide ($SiO_2$) or the like may be formed over the metal film by a sputtering method, and also metal oxide (e.g., a tungsten oxide film over a tungsten film) may be formed over the metal film. Further, for example, high-density-plasma treatment may be performed as plasma treatment. Besides the metal oxide film, metal nitride or metal oxynitride may be used. In this case, the metal film may be subjected to plasma treatment or heat treatment under a nitrogen atmosphere or an atmosphere containing a mixture of nitrogen and oxygen.

The amorphous semiconductor film 3405 is formed with a thickness of 10 nm to 200 nm inclusive (preferably a thickness of 30 nm to 150 nm inclusive) by a sputtering method, an LPCVD method, a plasma CVD method, or the like.

Next, the amorphous semiconductor film 3405 is crystallized by laser irradiation. Note that the crystallization of the amorphous semiconductor film 3405 may be performed by a method combining any of laser irradiation, a thermal crystallization method using a rapid thermal annealing (RTA) or an annealing furnace, or a thermal crystallization method using a metal element that promotes crystallization. After that, the obtained crystalline semiconductor film is etched into desired shapes, whereby crystalline semiconductor films 3405a, 3405b, 3405c, 3405d, 3405e, and 3405f are formed. Then, a gate insulating film 3406 is formed so as to cover the crystalline semiconductor films 3405a to 3405f (see FIG. 10B). Note that it is preferable to etch each end portion of the crystalline semiconductor films to have a taper. This is because the gate insulating film can be formed favorably with the tapered end portion.

The gate insulating film 3406 is formed using an insulating material such as silicon oxide, silicon nitride, silicon oxynitride ($SiO_xN_y$, where x>y), or silicon nitride oxide ($SiN_xO_y$, where x>y) by a CVD method, a sputtering method, or the like. For example, when the gate insulating film 3406 is formed to have a two-layer structure, a silicon oxynitride film may be formed as a first insulating film and a silicon nitride oxide film may be formed as a second insulating film. Alternatively, a silicon oxide film may be formed as the first insulating film and a silicon nitride film may be formed as the second insulating film.

Next, an example of a manufacturing process of the crystalline semiconductor films 3405a to 3405f is briefly described below. First, an amorphous semiconductor film having a thickness of 50 nm to 60 nm is formed by a plasma CVD method. Then, a solution containing nickel which is a metal element that promotes crystallization is retained on the amorphous semiconductor film, which is followed by dehydrogenation treatment (at 500° C. for one hour) and thermal crystallization treatment (at 550° C. for four hours) to form a crystalline semiconductor film. Then, the crystalline semiconductor film is irradiated with laser light and etched by a photolithography method, so that the crystalline semiconductor films 3405a to 3405f are formed. Note that crystallization of the amorphous semiconductor film may be performed only by laser irradiation without performing thermal crystallization using a metal element that promotes crystallization. Note that a single crystal semiconductor film may be employed without limitation to the above polycrystalline semiconductor film.

As a laser used for crystallization, a continuous wave laser (a CW laser beam) or a pulsed laser beam can be used. As a laser beam that can be used here, a laser beam emitted from one or plurality of the following lasers can be used: gas lasers such as an Ar laser, a Kr laser, and an excimer laser; a laser in which single crystal YAG, $YVO_4$, forsterite ($Mg_2SiO_4$), $YAlO_3$, or $GdVO_4$ or polycrystalline (ceramic) YAG, $Y_2O_3$, $YVO_4$, $YAlO_3$, or $GdVO_4$ is doped with one or more laser media of Nd, Yb, Cr, Ti, Ho, Er, Tm, and Ta as dopant; a glass laser; a ruby laser; an alexandrite laser; a Ti:sapphire laser; a copper vapor laser; and a metal vapor laser. When irradiation is performed with the fundamental wave of such a laser beam or the second to fourth harmonics of the fundamental wave, crystals with a large grain size can be obtained. For example, the second harmonic (532 nm) or the third harmonic (355 nm) of an Nd:$YVO_4$ laser (the fundamental wave of 1064 nm) can be used. In this case, a laser power density of approximately 0.01 $MW/cm^2$ to 100 $MW/cm^2$ (preferably 0.1 $MW/cm^2$ to 10 $MW/cm^2$ inclusive) is necessary, and irradiation is performed with a scanning speed of approximately 10 cm/sec to 2000 cm/sec. Note that the laser in which single crystal YAG, $YVO_4$, forsterite ($Mg_2SiO_4$), $YAlO_3$, or $GdVO_4$ or polycrystalline (ceramic) YAG, $Y_2O_3$, $YVO_4$, $YAlO_3$, or $GdVO_4$ is doped with one or more laser media of Nd, Yb, Cr, Ti, Ho, Er, Tm, and Ta as dopant; an Ar ion laser; or a Ti:sapphire laser can be used as a CW laser, whereas they can also be used as pulsed laser with a repetition rate of greater than or equal to 10 MHz by conducting a Q-switch operation, mode locking, or the like. When a laser beam is emitted at a repetition rate of greater than or equal to 10 MHz, the semiconductor film is irradiated with the next pulse after melting of the semiconductor film by laser beam and before solidification of the semiconductor film. Therefore, unlike the case of using a pulsed laser with a low repetition rate, a solid-liquid interface in the semiconductor film can be continuously moved. Thus, crystal grains which have grown continuously in a scanning direction can be obtained.

The gate insulating film 3406 may be formed by oxidization or nitridation of the surfaces of the crystalline semiconductor films 3405a to 3405f by the above high-density plasma treatment. For example, the gate insulating film 3406 is formed by plasma treatment in which a mixed gas of a rare gas such as He, Ar, Kr, or Xe, and oxygen, nitrogen oxide, ammonia, nitrogen, hydrogen, or the like is introduced. When plasma is excited by the introduction of microwaves, high-density plasma can be generated at a low electron temperature. With oxygen radicals (which may also include OH radicals) or nitrogen radicals (which may also include NH radicals) which are generated by the high-density plasma, the surfaces of the semiconductor films can be oxidized or nitrided.

By such high-density plasma treatment, an insulating film with a thickness of 1 nm to 20 nm inclusive, typically a thickness of 5 nm to 10 nm inclusive, is formed over the semiconductor films. Since the reaction in this case is a solid-phase reaction, interface state density between the insulating film and the semiconductor films can be extremely lowered. Since such high-density plasma treatment directly oxidizes (or nitrides) the semiconductor films (crystalline silicon or polycrystalline silicon), ideally, the insulating film can be formed with very little unevenness in its thickness. In addition, since the semiconductor layer in a crystal grain boundary of crystalline silicon is not strongly oxidized, an extremely preferable state is obtained. That is, by the solid-phase oxidation of the surfaces of the semiconductor films by high-density plasma treatment which is described here, an insulating film with a favorable uniformity and low interface state density can be formed without excessive oxidation reaction at a crystal grain boundary.

As the gate insulating film 3406, only an insulating film formed by high-density plasma treatment may be used, or a stacked layer which is obtained by deposition of an insulating film such as silicon oxide, silicon oxynitride, or silicon nitride on the insulating film by a CVD method using plasma or thermal reaction may be formed. In either case, a transistor which includes an insulating film formed by high-density plasma treatment in part or the whole of the gate insulating film can reduce variation of characteristics.

Further, the crystalline semiconductor films 3405a to 3405f which is obtained in such a manner that the semiconductor film is scanned in one direction for crystallization while being irradiated with a continuous wave laser beam or a laser beam emitted at a repetition rate of 10 MHz or more can grow their crystals in the laser beam scanning direction. When transistors are disposed so that the scanning direction is aligned with the channel length direction (the direction in which a carrier flows when a channel formation region is formed) and the above-described gate insulating film is used in combination with the transistors, thin film transistors with less variation in characteristics and high electric field-effect mobility can be obtained.

Next, a first conductive film and a second conductive film are stacked over the gate insulating film 3406. Here, the first conductive film is formed with a thickness of 20 nm to 100 nm inclusive by a CVD method, a sputtering method, or the like. The second conductive film is formed with a thickness of 100 nm to 400 nm inclusive. The first conductive film and the second conductive film are formed with an element selected from tantalum, tungsten, titanium, molybdenum, aluminum, copper, chromium, niobium, or the like, or an alloy material or a compound material containing the elements as its main component. Alternatively, the first conductive film and the second conductive film may be formed using a semiconductor material such as polycrystalline silicon imparting conductivity by being doped with an impurity element such as phosphorus. As combination examples of the first conductive film and the second conductive film, a tantalum nitride film and a tungsten film; a tungsten nitride film and a tungsten film; a molybdenum nitride film and a molybdenum film; and the like can be given. Tungsten and tantalum nitride have high heat resistance; therefore, after the first conductive film and the second conductive film are formed, heat treatment can be applied thereto for the purpose of heat activation. In addition, in the case where a three-layer structure is employed instead of a two-layer structure, it is preferable to employ a stacked structure in which an aluminum film is interposed between molybdenum films.

Next, a resist mask is formed using a photolithography method, and etching treatment which is performed to form a gate electrode and a gate line is performed, to form gate electrodes 3407 over the crystalline semiconductor films 3405a to 3405f. Here, an example in which the gate electrodes 3407 have a stacked structure which includes a first conductive film 3407a and a second conductive film 3407b is described.

Next, the gate electrodes 3407 are used as masks, and an impurity element imparting n-type conductivity is added to the crystalline semiconductor films 3405a, 3405b, 3405d, and 3405f at a low concentration by an ion doping method or an ion implantation method. Then, a resist mask is selectively formed by a photolithography method, and an impurity element imparting p-type conductivity is added at a high concentration to the crystalline semiconductor films 3405c and 3405e. As an impurity element imparting n-type conductivity, phosphorus, arsenic, or the like can be used. As an impurity element imparting p-type conductivity, boron, aluminum, gallium, or the like can be used. Here, phosphorus is used as an impurity element imparting n-type conductivity, and is selectively introduced into the crystalline semiconductor films 3405a, 3405b, 3405d, and 3405f such that they contain phosphorus at a concentration of $1\times10^{15}/cm^3$ to $1\times10^{19}/cm^3$. Thus, n-type impurity regions 3408 are formed. Further, boron is used as an impurity element imparting p-type conductivity, and is selectively introduced into the crystalline semiconductor films 3405c and 3405e such that they contain boron at a concentration of $1\times10^{19}/cm^3$ to $1\times10^{20}/cm^3$. Thus, p-type impurity regions 3409 are formed (see FIG. 10C).

Next, an insulating film is formed so as to cover the gate insulating film 3406 and the gate electrodes 3407. The insulating film is formed as a single layer or stacked layers of a film containing an inorganic material such as silicon, an oxide of silicon, or a nitride of silicon, and/or a film containing an organic material such as an organic resin, by a plasma CVD method, a sputtering method, or the like. Next, the insulating film is selectively etched using anisotropic etching which etches mainly in a perpendicular direction to form insulating films 3410 (also referred to as sidewalls) which are in contact with the side surfaces of the gate electrodes 3407. The insulating films 3410 are used as doping masks when LDD (lightly doped drain) regions are formed.

Next, using a resist mask formed by a photolithography method, the gate electrodes 3407, and the insulating films 3410 as masks, an impurity element imparting n-type conductivity is added at a high concentration to the crystalline semiconductor films 3405a, 3405b, 3405d, and 3405f to form n-type impurity regions 3411. Here, phosphorus is used as an impurity element imparting n-type conductivity, and it is selectively introduced into the crystalline semiconductor films 3405a, 3405b, 3405d, and 3405f such that they contain phosphorus at a concentration of $1\times10^{19}/cm^3$ to $1\times10^{20}/cm^3$. Thus, the n-type impurity regions 3411 which have a higher concentration than the impurity regions 3408 are formed.

By the foregoing steps, n-channel thin film transistors 3400a, 3400b, 3400d, and 3400f, and p-channel thin film transistors 3400c and 3400e are formed (see FIG. 10D).

In the n-channel thin film transistor 3400a, a channel formation region is formed in a region of the crystalline semiconductor film 3405a which overlaps with the gate electrode 3407; the impurity regions 3411 which each form either a source region or a drain region are formed in regions which do not overlap with the gate electrode 3407 and the insulating films 3410; and lightly doped drain regions (LDD regions) are formed in regions which overlap with the insulating films 3410 and which are between the channel formation region and the impurity regions 3411. Further, the n-channel thin film transistors 3400b, 3400d, and 3400f are similarly provided with channel formation regions, lightly doped drain regions, and the impurity regions 3411.

In the p-channel thin film transistor 3400c, a channel formation region is formed in a region of the crystalline semiconductor film 3405c which overlaps with the gate electrode 3407, and the impurity regions 3409 which each form either a source region or a drain region are formed in regions which do not overlap with the gate electrode 3407. Further, the p-channel thin film transistor 3400e is similarly provided with a channel formation region and the impurity regions 3409. Note that here, the p-channel thin film transistors 3400c and 3400e are not provided with LDD regions; however, the p-channel thin film transistors may be provided with an LDD region, and the n-channel thin film transistor may not be provided with an LDD region.

Next, an insulating film is formed as a single layer or stacked layers so as to cover the crystalline semiconductor films 3405a to 3405f, the gate electrodes 3407, and the like; and conductive films 3413 which are electrically connected to the impurity regions 3409 and/or the impurity regions 3411 which form source regions and drain regions of the thin film transistors 3400a to 3400f are formed over the insulating film (see FIG. 11A). The insulating film is formed as a single layer or stacked layers, using an inorganic material such as an oxide of silicon or a nitride of silicon, an organic material such as polyimide, polyamide, benzocyclobutene, acrylic, or epoxy, a siloxane material, or the like, by a CVD method, a sputtering method, an SOG method, a droplet discharging method, a screen printing method, or the like. Here, the insulating film has a two-layer structure. A silicon nitride oxide film is formed as a first insulating film 3412a, and a silicon oxynitride film is formed as a second insulating film 3412b. Further, the conductive films 3413 can form source electrodes and drain electrodes of the thin film transistors 3400a to 3400f.

Note that before the insulating film 3412a and the insulating film 3412b are formed or after one or more thin films of the insulating film 3412a and the insulating film 3412b are formed, heat treatment is preferably performed for recovery of the crystallinity of the semiconductor film, activation of an impurity element which has been added to the semiconductor film, or hydrogenation of the semiconductor film. As the heat treatment, a thermal annealing method, a laser annealing method, an RTA method, or the like is preferably used.

The conductive films 3413 are formed as a single layer or stacked layers, using an element selected from aluminum, tungsten, titanium, tantalum, molybdenum, nickel, platinum, copper, gold, silver, manganese, neodymium, carbon, or silicon, or an alloy material or a compound material containing the elements as its main component, by a CVD method, a sputtering method, or the like. An alloy material containing aluminum as its main component corresponds to, for example, a material which contains aluminum as its main component and also contains nickel, or an alloy material which contains aluminum as its main component and which also contains nickel and one of or both carbon and silicon. As for the stacked layer, the conductive films 3413 preferably employ, for example, a stacked structure including a barrier film, an aluminum-silicon film, and a barrier film, or a stacked structure including a barrier film, an aluminum-silicon film, a titanium nitride film, and a barrier film. Note that a barrier film is provided using a thin film formed using titanium, a nitride of titanium, molybdenum, or a nitride of molybdenum. Since aluminum and aluminum silicon have low resistance and are inexpensive, it is optimum as a material of the conductive films 3413. Further, generation of hillocks of aluminum and aluminum silicon can be prevented when upper and lower barrier layers are formed. Furthermore, when the barrier film is formed using titanium which is a highly-reducible element, even if a thin native oxide film is formed over the crystalline semiconductor film, the native oxide film can be reduced and removed, so that preferable contact with the crystalline semiconductor film can be obtained.

Next, an insulating film 3414 is formed so as to cover the conductive films 3413, and over the insulating film 3414, a conductive film 3415*a* and a conductive film 3415*b* which are each electrically connected to the conductive film 3413 which forms the source electrode or the drain electrode of each of the thin film transistors 3400*a* and 3400*f* are formed. Further, a conductive film 3416 which is electrically connected to the conductive film 3413 which forms the source electrode or the drain electrode of the thin film transistor 3400*b* or the like is formed. Note that the conductive film 3415*a*, the conductive film 3415*b*, and the conductive film 3416 may be formed using the same material in the same step. The conductive film 3415*a*, the conductive film 3415*b*, and the conductive film 3416 can be formed using any material which has been described for the above conductive films 3413.

Then, a conductive film 3417 which functions as an antenna is formed so as to be electrically connected to the conductive film 3416 (see FIG. 11B).

The insulating film 3414 can be provided by a CVD method, a sputtering method, or the like as a single layer or stacked layers of an insulating film containing oxygen and/or nitrogen, such as silicon oxide ($SiO_x$), silicon nitride ($SiN_x$), silicon oxynitride ($SiO_xN_y$, where x>y), or silicon nitride oxide ($SiN_xO_y$, where x>y); a film containing carbon, such as DLC (diamond-like carbon); an organic material such as epoxy, polyimide, polyamide, polyvinyl phenol, benzocyclobutene, or acrylic; or a siloxane material such as a siloxane resin. Note that the siloxane material corresponds to a material having a Si—O—Si bond. Siloxane has a skeleton structure formed from bonds of silicon and oxygen. As a substituent, an organic group (e.g., an alkyl group or an aryl group) or a fluoro group may be used. The organic group may contain a fluoro group.

The conductive film 3417 is formed using a conductive material by a CVD method, a sputtering method, a printing method such as a screen printing method or a gravure printing method, a droplet discharging method, a dispensing method, a plating method, or the like. The conductive film 3417 is formed as a single layer or stacked layers, using an element selected from aluminum, titanium, silver, copper, gold, platinum, nickel, palladium, tantalum, or molybdenum, or an alloy material or a compound material containing the elements as its main component.

For example, in the case of using a screen printing method to form the conductive film 3417 which functions as an antenna, the conductive film 3417 can be provided by selectively printing a conductive paste in which conductive particles having a grain size of several nm to several tens of micrometers are dissolved or dispersed in an organic resin. As conductive particles, metal particles of one or more of any of silver, gold, copper, nickel, platinum, palladium, tantalum, molybdenum, titanium, and the like; fine particles of silver halide; or dispersive nanoparticles can be used. In addition, as the organic resin included in the conductive paste, one or more organic resins selected from organic resins which function as a binder, a solvent, a dispersing agent, and a coating material for the metal particles can be used. Typically, an organic resin such as an epoxy resin or a silicon resin can be given. Further, it is preferable to perform baking after the conductive paste is applied. For example, in the case of using fine particles containing silver as a main component (e.g., the grain size of 1 nm to 100 nm inclusive) as a material for the conductive paste, the conductive film can be obtained by curing by baking at a temperature in the range of approximately 150° C. to 300° C. Alternatively, fine particles containing solder or lead-free solder as a main component may be used. In that case, fine particles having a grain size of less than or equal to 20 μm are preferably used. Solder and lead-free solder have advantages such as low cost.

Further, the conductive film 3415*a* and the conductive film 3415*b* can each function as a wiring which is electrically connected to a secondary battery included in the semiconductor device according to an embodiment of the present invention in a subsequent process. Furthermore, when the conductive film 3417 which functions as an antenna is formed, another conductive film may be separately formed such that it is electrically connected to the conductive film 3415*a* and the conductive film 3415*b*, and that the conductive film may be used as a wiring connected to the secondary battery.

Next, an insulating film 3418 is formed so as to cover the conductive film 3417, and then a layer including the thin film transistors 3400*a* to 3400*f*, the conductive film 3417, and the like (hereinafter referred to as an element formation layer 3419) is separated from the substrate 3401. Here, after the element formation layer 3419 is irradiated with laser light (e.g., UV light) to form openings in regions where the thin film transistors 3400*a* to 3400*f* are not formed (see FIG. 11C), the element formation layer 3419 can be separated from the substrate 3401 using physical force. Alternatively, before the element formation layer 3419 is separated from the substrate 3401, an etchant may be introduced into the formed openings to remove the separation layer 3403 selectively. As the etchant, a gas or liquid containing halogen fluoride or an interhalogen compound is used. For example, chlorine trifluoride is used as a gas containing halogen fluoride. Accordingly, the element formation layer 3419 is separated from the substrate 3401. Note that the separation layer 3403 may be partly left instead of being removed entirely. By removing the separation layer 3403 while leaving part thereof, consumption of the etchant and treatment time required for removing the separation layer can be reduced. Accordingly, throughput is improved and cost is reduced. Further, the element formation layer 3419 can be retained over the substrate 3401 even after the separation layer 3403 is removed. Furthermore, by reusing the substrate 3401 which is separated, cost can be reduced.

The insulating film 3418 can be formed by a CVD method, a sputtering method, or the like as a single layer or stacked layers of an insulating film which contains oxygen and/or nitrogen, such as silicon oxide ($SiO_x$), silicon nitride ($SiN_x$), silicon oxynitride ($SiO_xN_y$, where x>y), or silicon nitride oxide ($SiN_xO_y$, where x>y); a film containing carbon, such as DLC (diamond-like carbon); a film containing an organic material such as epoxy, polyimide, polyamide, polyvinyl phenol, benzocyclobutene, or acrylic; or a film containing a siloxane material such as a siloxane resin.

Figure 12A:
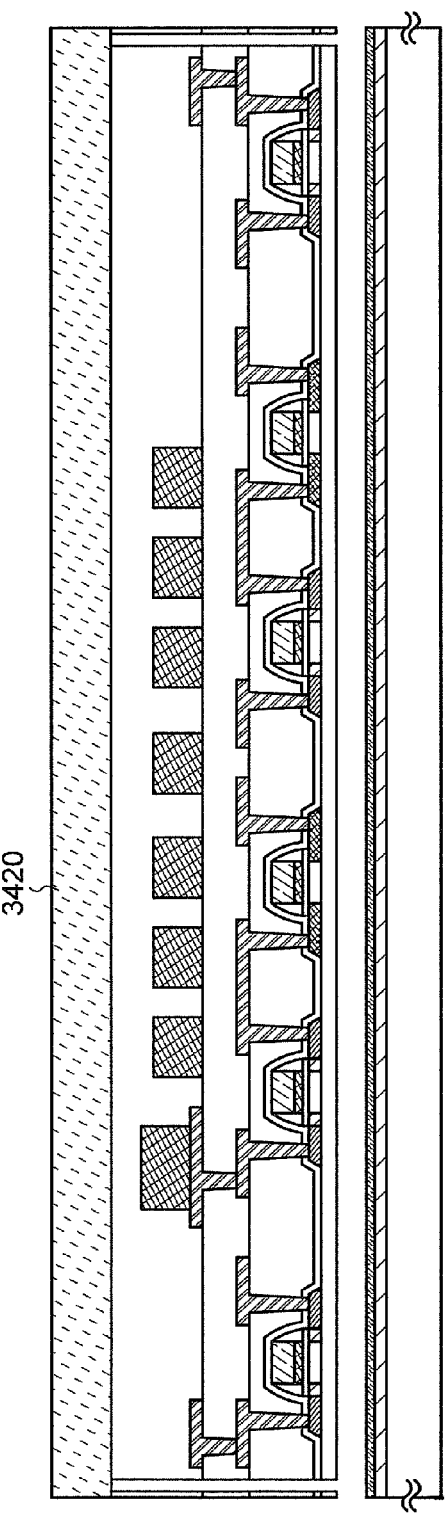
FIGS. 12A and 12B illustrate the method for manufacturing a semiconductor device to which an embodiment of the present invention is applied.

In one mode of this embodiment, the openings are formed in the element formation layer 3419 by laser irradiation, and then a first sheet material 3420 is attached to one surface of the element formation layer 3419 (a surface where the insulating film 3418 is exposed). Then, the element formation layer 3419 is separated from the substrate 3401 (see FIG. 12A).

Figure 12B:
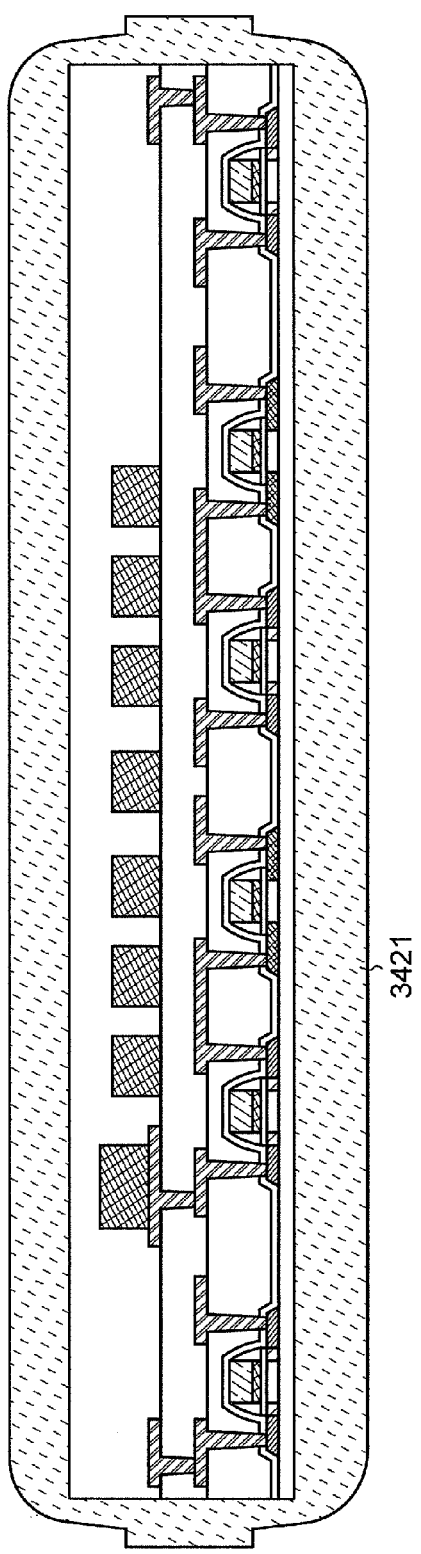

Next, after a second sheet material 3421 is attached to the other surface of the element formation layer 3419 (a surface exposed by separation), the first sheet material 3420 and the second sheet material 3421 are attached together by performing one of or both heat treatment and pressure treatment (see FIG. 12B). As the first sheet material 3420 and the second sheet material 3421, a hot-melt film or the like can be used.

As the first sheet material 3420 and the second sheet material 3421, films on which antistatic treatment for preventing static electricity or the like has been performed (hereinafter referred to as antistatic films) can be used. Examples of antistatic films are films in which an antistatic material is dispersed in a resin, films to which an antistatic material is attached, and the like. A film provided with an antistatic material may be a film which has an antistatic material provided over only one of its surfaces, or a film which has antistatic materials provided over both of its surfaces. As for the film which has an antistatic material provided over one of its surfaces, the film may be attached to the layer such that the antistatic material is on the inner side of the film or the outer side of the film. Note that the antistatic material may be provided over the entire surface of the film or over part of the film. Here, as an antistatic material, a conductive material such as a metal, indium tin oxide (ITO), or a surfactant such as an amphoteric surfactant, a cationic surfactant, or a nonionic surfactant can be used. In addition to that, as an antistatic material, a resin material containing a cross-linked copolymer having a carboxyl group and a quaternary ammonium base on its side chain, or the like can be used. By attaching, mixing, or applying such a material to a film, an antistatic film can be formed. By performing sealing using the antistatic film, a semiconductor element can be prevented from being adversely affected by static electricity from outside and the like when dealt with as a product.

Note that a storage capacitor of a power source circuit is formed such that a thin film secondary battery is connected to the conductive film 3415a and the conductive film 3415b. The secondary battery may be connected to the conductive films before the element formation layer 3419 is separated from the substrate 3401 (at a stage illustrated in FIG. 11B or 11C), after the element formation layer 3419 is separated from the substrate 3401 (at a stage illustrated in FIG. 12A), or after the element formation layer 3419 is sealed with the first sheet material and the second sheet material (at a stage illustrated in FIG. 12B). An example of the structure in which the element formation layer 3419 and the secondary battery are connected to each other is described below with reference to FIGS. 13A and 13B and FIGS. 14A and 14B.

In FIG. 11B, a conductive film 3431a and a conductive film 3431b which are electrically connected to the conductive film 3415a and the conductive film 3415b, respectively, are formed at the same time as the conductive film 3417 which functions as an antenna. Next, the insulating film 3418 is formed so as to cover the conductive film 3417, the conductive film 3431a, and the conductive film 3431b. Then, an opening 3432a and an opening 3432b are formed so as to expose the surfaces of the conductive film 3431a and the conductive film 3431b. Then, after the openings are formed in the element formation layer 3419 by laser irradiation, the first sheet material 3420 is attached to one surface of the element formation layer 3419 (the surface where the insulating film 3418 is exposed), and then the element formation layer 3419 is separated from the substrate 3401 (see FIG. 13A).

Next, the second sheet material 3421 is attached to the other surface (a surface exposed by separation) of the element formation layer 3419, and the element formation layer 3419 is then separated from the first sheet material 3420. Accordingly, here, a sheet material with weak adhesion is used as the first sheet material 3420. Then, a conductive film 3434a and a conductive film 3434b which are electrically connected to the conductive film 3431a and the conductive film 3431b, respectively, through the opening 3432a and the opening 3432b, are selectively formed (see FIG. 13B).

The conductive film 3434a and the conductive film 3434b are formed using a conductive material by a CVD method, a sputtering method, a printing method such as a screen printing method or a gravure printing method, a droplet discharging method, a dispensing method, a plating method, or the like. The conductive film 3434a and the conductive film 3434b are formed as a single layer or stacked layers, using an element selected from aluminum, titanium, silver, copper, gold, platinum, nickel, palladium, tantalum, or molybdenum, or an alloy material or a compound material containing the elements as its main component.

Note that here, an example in which the conductive film 3434a and the conductive film 3434b are formed after the element formation layer 3419 is separated from the substrate 3401 is described; however, the element formation layer 3419 may be separated from the substrate 3401 after the conductive film 3434a and the conductive film 3434b are formed.

Figure 14A:
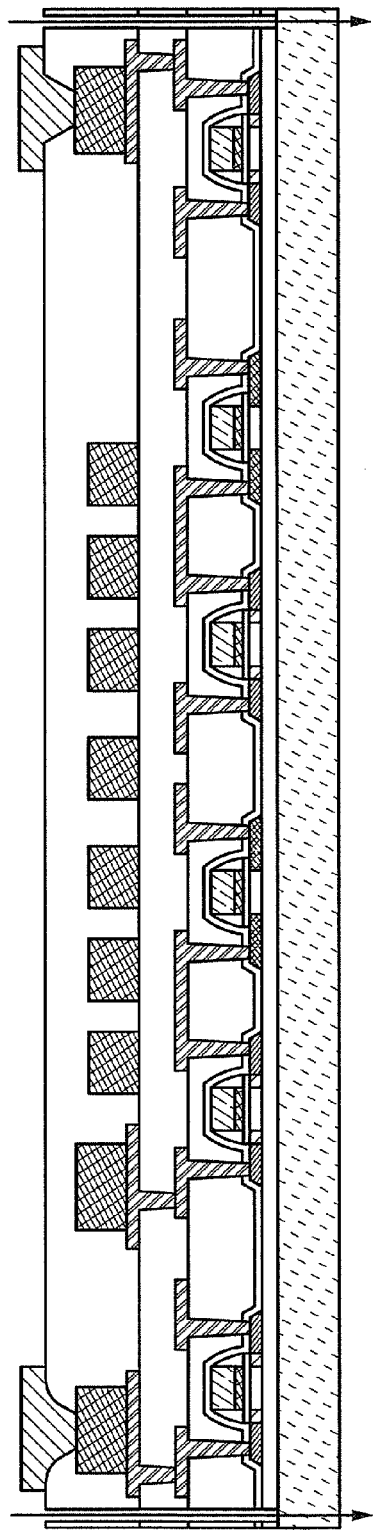
FIGS. 14A and 14B illustrate the method for manufacturing a semiconductor device to which an embodiment of the present invention is applied.

Next, in the case where a plurality of elements are formed over the substrate, the element formation layer 3419 is separated into individual elements (see FIG. 14A). A laser irradiation apparatus, a dicing apparatus, a scribing apparatus, or the like can be used for the separation. Here, the plurality of elements formed over one substrate are separated from one another by laser irradiation.

Figure 14B:
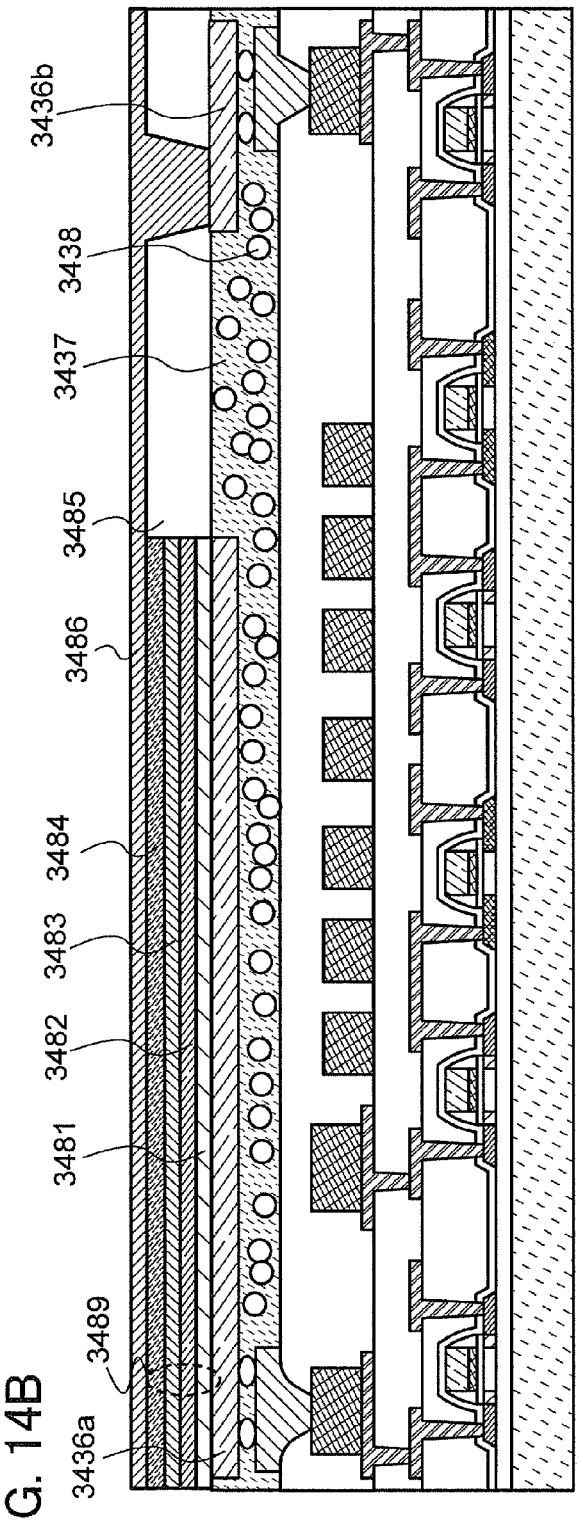

Next, the separated elements are electrically connected to the secondary battery (see FIG. 14B). In one mode of this embodiment, a thin film secondary battery is used for the storage capacitor of the power source circuit, and the following thin films are sequentially stacked: a current-collecting thin film, a negative electrode active material layer, a solid electrolyte layer, a positive electrode active material layer, and a current-collecting thin film.

A conductive film 3436a and a conductive film 3436b are each formed using a conductive material by a CVD method, a sputtering method, a printing method such as a screen printing method or a gravure printing method, a droplet discharging method, a dispensing method, a plating method, or the like. The conductive film 3436a and the conductive film 3436b are each formed as a single layer or stacked layers, using an element selected from aluminum, titanium, silver, copper, gold, platinum, nickel, palladium, tantalum, or molybdenum, or an alloy material or a compound material containing the elements as its main component. The conductive material needs to have low resistance and high adhesion to a negative electrode active material. Aluminum, copper, nickel, vanadium, or the like is particularly preferable as the conductive material.

When the structure of the thin film secondary battery is described in detail, a negative electrode active material layer 3481 is formed over the conductive film 3436a. In general, vanadium oxide ($V_2O_5$) or the like is used. Next, a solid electrolyte layer 3482 is formed over the negative electrode active material layer 3481. In general, lithium phosphate ($Li_3PO_4$) or the like is used. Then, a positive electrode active material layer 3483 is formed over the solid electrolyte layer 3482. In general, lithium manganate ($LiMn_2O_4$) or the like is used. Alternatively, lithium cobaltate ($LiCoO_2$) or lithium nickelate ($LiNiO_2$) may be used. Next, a current-collecting thin film 3484 that becomes an electrode is formed over the positive electrode active material layer 3483. The current-collecting thin film 3484 needs to have low resistance and high adhesion to the positive electrode active material layer 3483. Aluminum, copper, nickel, vanadium, or the like can be used as the current-collecting thin film 3484.

Each of the foregoing thin film layers, that is, the negative electrode active material layer 3481, the solid electrolyte layer 3482, the positive electrode active material layer 3483, and the current-collecting thin film 3484, may be formed using a sputtering technique or an evaporation technique. The thickness of each layer is preferably 0.1 µm to 3 µm.

Next, a resin film is formed by a spin coating method or the like. Then, the resin film is etched to form a contact hole, so that an interlayer film 3485 is formed. The interlayer film 3485 is not limited to a resin film, and the interlayer film may be another film such as an oxide film formed by a CVD method; however, a resin film is preferable in terms of flatness. Alternatively, when a photosensitive resin is used, the contact hole can be formed without etching. Then, a wiring layer 3486 is formed over the interlayer film 3485 and the wiring layer 3486 is connected to the conductive film 3436b, whereby electrical connection with the secondary battery is obtained.

Here, the conductive film 3434a and the conductive film 3434b provided over the element formation layer 3419 are connected to the conductive film 3436a and the conductive film 3436b, respectively, that serve as connecting terminals of a thin film secondary battery 3489 which has been formed in advance. The case is shown in which the conductive film 3434a and the conductive film 3436a, or the conductive film 3434b and the conductive film 3436b are pressure-bonded to each other with a material having an adhesive property such as an anisotropic conductive film (ACF) or an anisotropic conductive paste (ACP) interposed therebetween, so that they are electrically connected to each other. An example is shown here in which conductive particles 3438 contained in a resin 3437 having an adhesive property are used for connection. Alternatively, connection can also be obtained using a conductive adhesive agent such as a silver paste, a copper paste, or a carbon paste; solder bonding; or the like.

Note that a structure of a transistor can be of various modes, and is not limited to the specific structure described in one mode of this embodiment. For example, a multi-gate structure including two or more gate electrodes may be used. In a multi-gate structure, channel regions are connected in series; accordingly, the structure is that in which a plurality of transistors are connected in series. By having a multi-gate structure, off-current is reduced, withstand voltage of the transistors is enhanced and reliability is improved, and even if voltage between the drain electrode and the source electrode changes when operating in a saturation region, current between the drain electrode and the source electrode does not change very much and flat characteristics or the like can be obtained. In addition, the structure may be that in which gate electrodes are placed over and below a channel. With a structure in which gate electrodes are placed over and below the channel, the channel region increases; accordingly, a current value can be increased and a depletion layer is easily formed, whereby a subthreshold swing (S value) can be reduced. When the gate electrodes are placed over and below the channel, the structure is that in which a plurality of transistors are connected in parallel.

Alternatively, the transistor used in an embodiment of the present invention may have a structure in which a gate electrode is placed over a channel formation region, a structure in which a gate electrode is placed below a channel formation region, a staggered structure, or an inverted staggered structure. Further alternatively, the structure may be that in which a channel formation region is divided into a plurality of regions, and the plurality of channel formation regions may be connected in parallel or in series. Further, a source electrode or a drain electrode may overlap with a channel formation region (or part thereof). With the use of the structure in which the source electrode or the drain electrode overlaps with the channel formation region (or part thereof), unstable operation due to accumulation of electric charge in part of the channel formation region can be prevented. Further, there may also be an LDD (Lightly Doped Drain) region. With an LDD region, off-current is reduced, withstand voltage of the transistors is enhanced and reliability is improved, and even if voltage between the drain electrode and the source electrode changes when operating in a saturation region, current between the drain electrode and the source electrode does not change very much and flat characteristics or the like can be obtained.

Note that the manufacturing method of a semiconductor device according to one mode of this embodiment can be applied to any of the semiconductor devices described in this specification. That is, according to one mode of this embodiment, a semiconductor device capable of transmitting and receiving information can be manufactured in such a manner that a difference between a signal line and a reference line in a signal waveform is detected so that a demodulation signal is generated and a demodulation signal is generated stably even from a signal whose modulation factor is small.

Further, a semiconductor device which can demodulate a signal by canceling noise of each line and reducing influence of noise which results from a carrier wave can be manufactured.

Furthermore, a semiconductor device which can stably detect a signal also as to a wireless signal whose modulation factor is 10% and stably perform signal transmission and reception which are based on ISO/IEC 15693 can be manufactured.

In the semiconductor device according to an embodiment of the present invention, power from a power source is continuously supplied during reception of a wireless signal; therefore, the semiconductor device can be operated stably. Further, the semiconductor device can be wirelessly charged; therefore, shortage of power for transmitting and receiving individual information, which is due to deterioration of a battery over time, can be compensated.

Further, a semiconductor device can be manufactured in which a difference between an output of a first bias circuit and an output of a second bias circuit is detected so that a demodulation signal is generated, a demodulation signal can be generated stably even from a signal whose modulation factor is small, and a signal can be demodulated by reducing influence of noise.

Moreover, in the semiconductor device according to an embodiment of the present invention, power from a power source is continuously supplied during reception of a carrier wave whose modulation factor is 10%; therefore, the semiconductor device can be operated stably. Further, the semiconductor device can be wirelessly charged; therefore, shortage of power for transmitting and receiving individual information, which is due to deterioration of a battery over time, can be compensated.

Embodiment 3

In one mode of this embodiment, an example of the method for manufacturing the semiconductor device, which is described in one mode of the above embodiment, will be described with reference to drawings. In one mode of this embodiment, a structure in which an antenna, a battery, and a signal processing circuit of the semiconductor device are formed over one substrate will be described. Note that an antenna, a battery, and a signal processing circuit are formed together over a single crystal substrate, using a transistor including a channel formation region. When a transistor is formed over a single crystal substrate, a semiconductor device having a transistor with few variations in electric characteristics can be formed, which is preferable. In addition, an example is described in which a thin-film secondary battery is used as a battery.

Figure 15A:
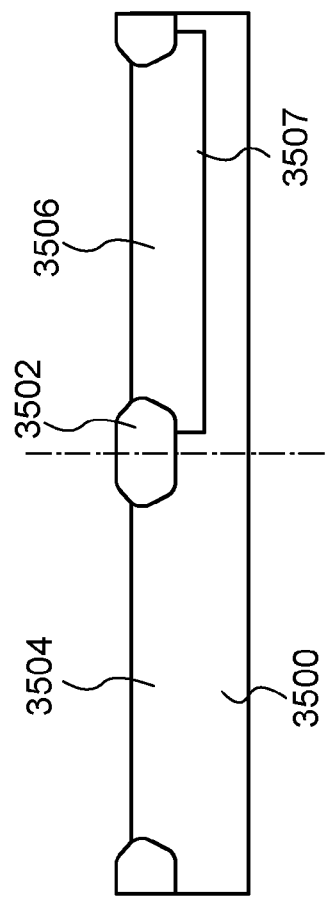
FIGS. 15A to 15C illustrate a method for manufacturing a semiconductor device to which an embodiment of the present invention is applied.

First, a region 3504 and a region 3506 are formed in a semiconductor substrate 3500 by separating an element region (see FIG. 15A). The region 3504 and the region 3506 provided in the semiconductor substrate 3500 are separated from each other by an insulating film (also referred to as a field oxide film) 3502. The example shown here is the case where a single crystal silicon substrate having n-type conductivity is used as the semiconductor substrate 3500, and a p-well 3507 is formed in the region 3506 of the semiconductor substrate 3500.

Any substrate can be used as the semiconductor substrate 3500 as long as it is a semiconductor substrate. For example, a single crystal silicon substrate having n-type or p-type conductivity, a compound semiconductor substrate (e.g., a GaAs substrate, an InP substrate, a GaN substrate, a SiC substrate, a sapphire substrate, a ZnSe substrate, or the like), an SOI (silicon on insulator) substrate formed by a bonding method or a SIMOX (separation by implanted oxygen) method, or the like can be used.

The region 3504 and the region 3506 can be formed by a selective oxidation (LOCOS: local oxidation of silicon) method, a trench isolation method, or the like as appropriate.

In addition, the p-well 3507 formed in the region 3506 of the semiconductor substrate 3500 can be formed by selective introduction of the semiconductor substrate 3500 with an impurity element imparting p-type conductivity. As an impurity element imparting p-type conductivity, boron, aluminum, gallium, or the like can be used.

In one mode of this embodiment, although an impurity element is not introduced into the region 3504 because an n-type semiconductor substrate is used as the semiconductor substrate 3500, an n-well may be formed in the region 3504 by introduction of an impurity element imparting n-type conductivity. As an impurity element imparting n-type conductivity, phosphorus, arsenic, or the like can be used. When a p-type semiconductor substrate is used, on the other hand, an impurity element imparting n-type conductivity may be introduced into the region 3504 to form an n-well, whereas an impurity element may not be introduced into the region 3506.

Figure 15B:
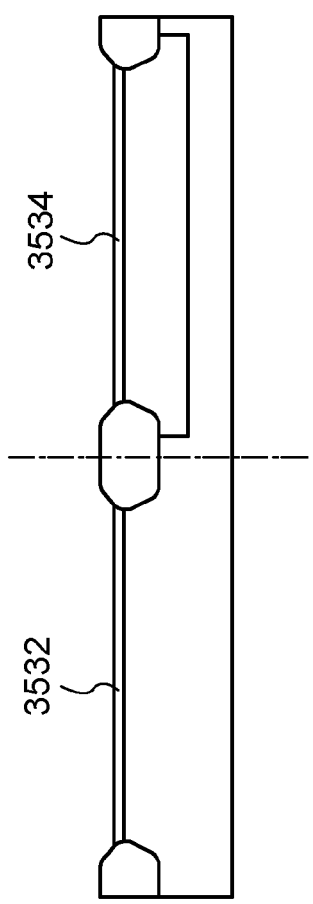

Next, an insulating film 3532 and an insulating film 3534 are formed so as to cover the region 3504 and the region 3506, respectively (see FIG. 15B).

For example, the surfaces of the region 3504 and the region 3506 provided in the semiconductor substrate 3500 are oxidized by heat treatment, so that the insulating film 3532 and the insulating film 3534 can be formed using silicon oxide films. Alternatively, the insulating film 3532 and the insulating film 3534 may be formed to have a stacked structure of a silicon oxide film and a film containing oxygen and nitrogen (a silicon oxynitride film) by the steps of forming a silicon oxide film by a thermal oxidation method and then nitriding the surface of the silicon oxide film by nitridation treatment.

Further alternatively, the insulating film 3532 and the insulating film 3534 may be formed by plasma treatment as described above. For example, the insulating film 3532 and the insulating film 3534 can be formed using a silicon oxide film or a silicon nitride film which is obtained by application of high-density plasma oxidation or high-density plasma nitridation treatment to the surfaces of the region 3504 and the region 3506 provided in the semiconductor substrate 3500. Furthermore, after high-density plasma oxidation treatment is applied to the surfaces of the region 3504 and the region 3506, high-density plasma nitridation treatment may be performed. In that case, silicon oxide films are formed so as to be in contact with the surfaces of the region 3504 and the region 3506, and then silicon oxynitride films are formed on the silicon oxide films. Thus, the insulating film 3532 and the insulating film 3534 are each formed to have a stacked structure of the silicon oxide film and the silicon oxynitride film. In addition, after silicon oxide films are formed on the surfaces of the region 3504 and the region 3506 by a thermal oxidation method, high-density plasma oxidation or high-density plasma nitridation treatment may be applied to the silicon oxide films.

The insulating film 3532 and the insulating film 3534 formed over the region 3504 and the region 3506 of the semiconductor substrate 3500, respectively, function as gate insulating films of transistors which will be completed later.

Figure 15C:
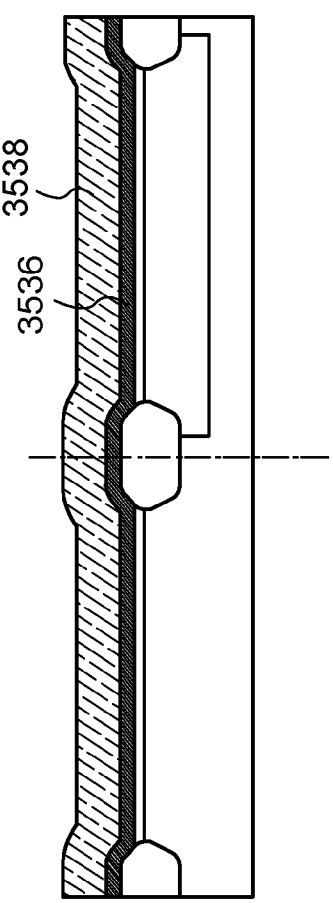

Next, a conductive film is formed so as to cover the insulating film 3532 and the insulating film 3534 which are formed over the region 3504 and the region 3506, respectively (see FIG. 15C). Here, an example is shown in which a conductive film 3536 and a conductive film 3538 are sequentially stacked as the conductive film. It is needless to say that the conductive film may be formed to have a single layer or a stacked structure of three or more layers.

As materials of the conductive film 3536 and the conductive film 3538, an element selected from tantalum, tungsten, titanium, molybdenum, aluminum, copper, chromium, niobium, or the like, or an alloy material or a compound material containing the elements as its main component can be used. Alternatively, a metal nitride film obtained by nitridation of the above element can be used. Besides, a semiconductor material typified by polycrystalline silicon doped with an impurity element such as phosphorus can be used.

Here, a stacked structure is employed in which the conductive film 3536 is formed using a tantalum nitride film and the conductive film 3538 is formed thereover using a tungsten film. It is possible to form the conductive film 3536 as a single layer or stacked layers of a film or films including a material selected from tantalum nitride, tungsten nitride, molybdenum nitride, and/or titanium nitride, and form the conductive film 3538 as a single layer or stacked layers of a film or films including a material selected from tungsten, tantalum, molybdenum, and/or titanium.

Next, the stacked conductive film 3536 and the conductive film 3538 are selectively removed by etching, so that the conductive film 3536 and the conductive film 3538 remain above desired part of the region 3504 and the region 3506, respectively. Thus, a gate electrode 3540 and a gate electrode 3542 are formed (see FIG. 16A).

Next, a resist mask 3548 is selectively formed so as to cover the region 3504, and an impurity element is introduced into desired part of the region 3506, using the resist mask 3548 and the gate electrode 3542 as masks, so that impurity regions are formed (see FIG. 16B). As the impurity element, an impurity element imparting n-type conductivity or an impurity element imparting p-type conductivity is used. As an impurity element imparting n-type conductivity, phosphorus, arsenic, or the like can be used. As an impurity element imparting p-type conductivity, boron, aluminum, gallium, or the like can be used. Here, phosphorus is used as the impurity element.

In FIG. 16B, by introduction of the impurity element, impurity regions 3552 which form a source region and a drain region, and a channel formation region 3550 are formed in the region 3506.

Next, a resist mask 3566 is selectively formed so as to cover the region 3506, and an impurity element is introduced into the region 3504, using the resist mask 3566 and the gate electrode 3540 as masks, so that impurity regions are formed (see FIG. 16C). As the impurity element, an impurity element imparting n-type conductivity or an impurity element imparting p-type conductivity is used. As an impurity element imparting n-type conductivity, phosphorus, arsenic, or the like can be used. As an impurity element imparting p-type conductivity, boron, aluminum, gallium, or the like can be used. At this time, an impurity element (e.g., boron) of a conductivity type different from that of the impurity element introduced into the region 3506 in FIG. 16B is used. As a result, impurity regions 3570 which form a source region and a drain region, and a channel formation region 3568 are formed in the region 3504.

Figure 17A:
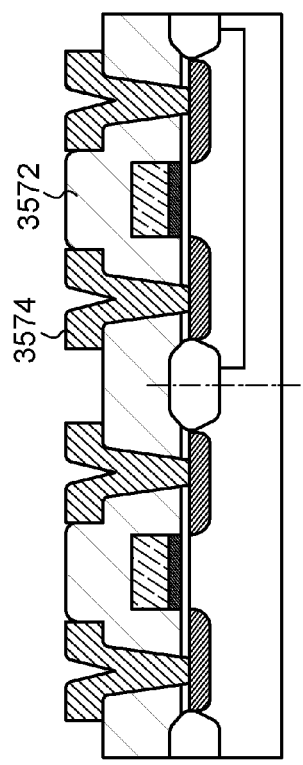
FIGS. 17A and 17B illustrate the method for manufacturing a semiconductor device to which an embodiment of the present invention is applied.

Next, an insulating film 3572 is formed so as to cover the insulating film 3532, the insulating film 3534, the gate electrode 3540, and the gate electrode 3542. Then, wirings 3574 which are electrically connected to the impurity regions 3552 and the impurity regions 3570 formed in the region 3506 and 3504, respectively, are formed over the insulating film 3572 (see FIG. 17A).

The second insulating film 3572 can be provided by a CVD method, a sputtering method, or the like as a single layer or stacked layers of an insulating film containing oxygen and/or nitrogen, such as silicon oxide ($SiO_x$), silicon nitride ($SiN_x$), silicon oxynitride ($SiO_xN_y$, where x>y), or silicon nitride oxide ($SiN_xO_y$, where x>y); a film containing carbon, such as DLC (diamond-like carbon); an organic material such as epoxy, polyimide, polyamide, polyvinyl phenol, benzocyclobutene, or acrylic; or a siloxane material such as a siloxane resin. Note that the siloxane material corresponds to a material having a Si—O—Si bond. Siloxane has a skeleton structure formed from bonds of silicon and oxygen. As a substituent, an organic group (e.g., an alkyl group or an aryl group) or a fluoro group may be used. The organic group may contain a fluoro group.

The wirings 3574 are formed as a single layer or stacked layers, using an element selected from aluminum, tungsten, titanium, tantalum, molybdenum, nickel, platinum, copper, gold, silver, manganese, neodymium, carbon, or silicon, or an alloy material or a compound material containing the elements as its main component, by a CVD method, a sputtering method, or the like. An alloy material containing aluminum as its main component corresponds to, for example, a material which contains aluminum as its main component and also contains nickel, or an alloy material which contains aluminum as its main component and which also contains nickel and one of or both carbon and silicon. As for the stacked layer, the wiring 3574 preferably employ, for example, a stacked structure including a barrier film, an aluminum-silicon film, and a barrier film, or a stacked structure including a barrier film, an aluminum-silicon film, a titanium nitride film, and a barrier film. Note that a barrier film is provided using a thin film formed using titanium, a nitride of titanium, molybdenum, or a nitride of molybdenum. Since aluminum and aluminum silicon have low resistance and are inexpensive, it is optimum as a material of the wiring 3574. Further, generation of hillocks of aluminum and aluminum silicon can be prevented when upper and lower barrier layers are formed. Furthermore, when the barrier film is formed using titanium which is a highly-reducible element, even if a thin native oxide film is formed over a crystalline semiconductor film, the native oxide film can be reduced and removed, so that preferable contact with the crystalline semiconductor film can be obtained.

Note that the structure of transistors applied to an embodiment of the present invention is not limited to the structure illustrated in drawings. For example, a transistor with an inverted staggered structure, a FinFET structure, or the like can be applied. A FinFET structure is preferable because it can suppress a short channel effect which occurs along with reduction in transistor size.

The semiconductor device according to an embodiment of the present invention includes a battery which can store electric power and supply electric power to the signal processing circuit. As the battery, a capacitor such as an electric double layer capacitor or a thin-film secondary battery is preferably used. Thus, in one mode of this embodiment, a connection between the transistor and a thin-film secondary battery is described.

Figure 17B:
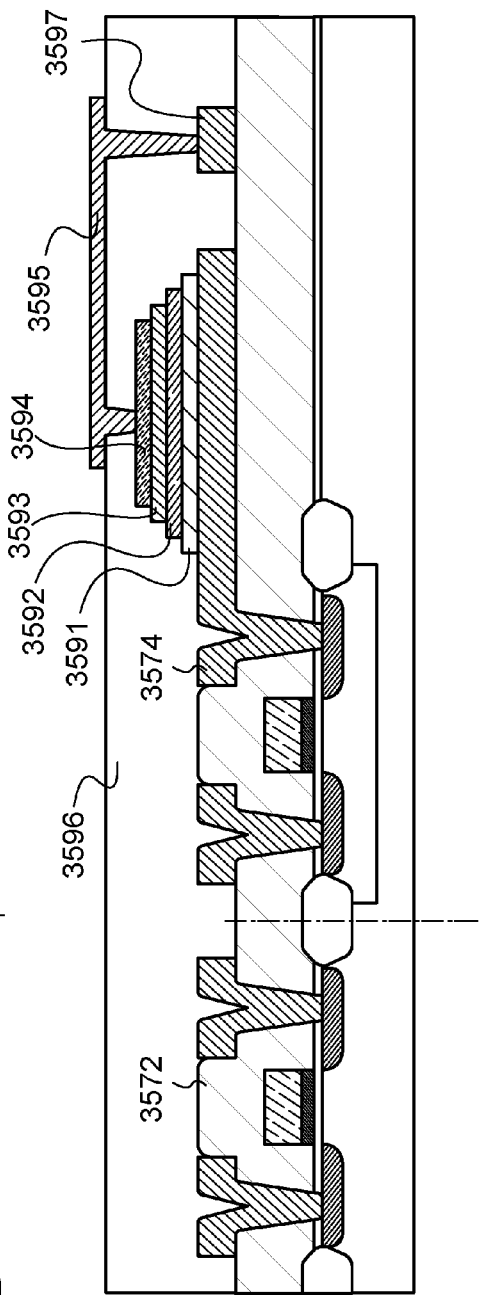

In one mode of this embodiment, the secondary battery is stacked over the wiring 3574 connected to the transistor. The secondary battery has a structure in which a current-collecting thin film, a negative electrode active material layer, a solid electrolyte layer, a positive electrode active material layer, and a current-collecting thin film are sequentially stacked (see FIG. 17B). Therefore, the material of the wiring 3574 which also has a function of the current-collecting thin film of the secondary battery needs to have low resistance and high adhesion to the negative electrode active material. Aluminum, copper, nickel, vanadium, or the like is particularly preferable as the material.

Next, the structure of the thin film secondary battery is described in detail. First, a negative electrode active material layer 3591 is formed over the wiring 3574. In general, vanadium oxide ($V_2O_5$) or the like is used. Next, a solid electrolyte layer 3592 is formed over the negative electrode active material layer 3591. In general, lithium phosphate ($Li_3PO_4$) or the like is used. Then, a positive electrode active material layer 3593 is formed over the solid electrolyte layer 3592. In general, lithium manganate ($LiMn_2O_4$) or the like is used. Alternatively, lithium cobaltate ($LiCoO_2$) or lithium nickelate ($LiNiO_2$) may be used. Next, a current-collecting thin film 3594 that becomes an electrode is formed over the positive electrode active material layer 3593. The current-collecting thin film 3594 needs to have low resistance and high adhesion to the positive electrode active material layer 3593. Aluminum, copper, nickel, vanadium, or the like can be used as the current-collecting thin film 3594.

Each of the foregoing thin film layers, that is, the negative electrode active material layer 3591, the solid electrolyte layer 3592, the positive electrode active material layer 3593, and the current-collecting thin film 3594, may be formed using a sputtering technique or an evaporation technique. The thickness of each layer is preferably 0.1 μm to 3 μM.

Next, a resin film is formed by a spin coating method or the like. Then, the resin film is etched to form a contact hole, so that an interlayer film 3596 is formed. The interlayer film 3596 is not limited to a resin film, and the interlayer film may be another film such as an oxide film formed by a CVD method; however, a resin film is preferable in terms of flatness. Alternatively, when a photosensitive resin is used, the contact hole can be formed without etching. Then, a wiring layer 3595 is formed over the interlayer film 3596 and the wiring layer 3595 is connected to a wiring 3597, whereby electrical connection with the secondary battery is obtained.

With the above-described structure, the semiconductor device according to an embodiment of the present invention can have a structure in which transistors are formed over a single crystal substrate and a thin-film secondary battery is formed thereover. Thus, in one mode of this embodiment, a semiconductor device which is very thin and small can be formed.

Note that the manufacturing method of a semiconductor device according to one mode of this embodiment can be applied to any of the semiconductor devices described in this specification. That is, according to one mode of this embodiment, a semiconductor device capable of transmitting and receiving information can be manufactured in such a manner that a difference between a signal line and a reference line in a signal waveform is detected so that a demodulation signal is generated and a demodulation signal is generated stably even from a signal whose modulation factor is small.

Further, a semiconductor device which can demodulate a signal by canceling noise of each line and reducing influence of noise which results from a carrier wave can be manufactured.

Furthermore, a semiconductor device which can stably detect a signal also as to a wireless signal whose modulation factor is 10% and stably perform signal transmission and reception which are based on ISO/IEC 15693 can be manufactured.

In the semiconductor device according to an embodiment of the present invention, power from a power source is continuously supplied during reception of a wireless signal; therefore, the semiconductor device can be operated stably. Further, the semiconductor device can be wirelessly charged; therefore, shortage of power for transmitting and receiving individual information, which is due to deterioration of a battery over time, can be compensated.

Further, a semiconductor device can be manufactured in which a difference between an output of a first bias circuit and an output of a second bias circuit is detected so that a demodulation signal is generated, a demodulation signal can be generated stably even from a signal whose modulation factor is small, and a signal can be demodulated by reducing influence of noise.

Moreover, in the semiconductor device according to an embodiment of the present invention, power from a power source is continuously supplied during reception of a carrier wave whose modulation factor is 10%; therefore, the semiconductor device can be operated stably. Further, the semiconductor device can be wirelessly charged; therefore, shortage of power for transmitting and receiving individual information, which is due to deterioration of a battery over time, can be compensated.

Embodiment 4

In one mode of this embodiment, an example of a method for manufacturing a semiconductor device, which is different from that described in one mode of the above embodiment, will be described with reference to drawings.

First, an insulating film is formed over a substrate 3600. Here, a single crystal silicon substrate having n-type conductivity is used as the substrate 3600, and an insulating film 3602 and an insulating film 3604 are formed over the substrate 3600 (see FIG. 18A). For example, a silicon oxide film is formed as the insulating film 3602 by application of heat treatment to the substrate 3600, and then a silicon nitride film is formed over the insulating film 3602 by a CVD method.

The substrate 3600 is not limited to a silicon substrate as long as it is a semiconductor substrate. For example, a single crystal silicon substrate having n-type or p-type conductivity, a compound semiconductor substrate (e.g., a GaAs substrate, an InP substrate, a GaN substrate, a SiC substrate, a sapphire substrate, a ZnSe substrate, or the like), an SOI (silicon on insulator) substrate formed by a bonding method or a SIMOX (separation by implanted oxygen) method, or the like can be used.

Alternatively, after the insulating film 3602 is formed, the insulating film 3604 may be formed by nitridation of the insulating film 3602 by high-density plasma treatment. Note that the insulating film provided over the substrate 3600 may have a single-layer structure or a stacked structure of three or more layers.

Next, patterns of a resist mask 3606 are selectively formed over the insulating film 3604, and selective etching is performed using the resist mask 3606 as a mask, so that recessed portions 3608 are selectively formed in the substrate 3600 (see FIG. 18B). For the etching part of the substrate 3600, and the insulating film 3602 and the insulating film 3604, plasma dry etching can be performed.

Next, the patterns of the resist mask 3606 are removed, and then an insulating film 3610 is formed so as to fill the recessed portions 3608 formed in the substrate 3600 (see FIG. 18C).

The insulating film 3610 is formed using an insulating material such as silicon oxide, silicon nitride, silicon oxynitride ($SiO_xN_y$, where x>y), or silicon nitride oxide ($SiN_xO_y$, where x>y) by a CVD method, a sputtering method, or the like. As the insulating film 3610, a silicon oxide film is formed by an atmospheric pressure CVD method or a low-pressure CVD method, using a TEOS (tetraethyl orthosilicate) gas.

Figure 19A:
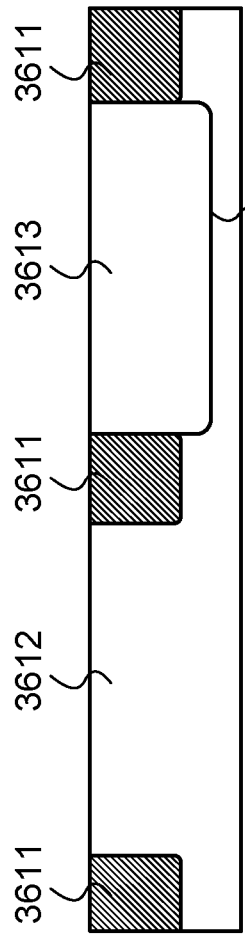
FIGS. 19A to 19C illustrate the method for manufacturing a semiconductor device to which an embodiment of the present invention is applied.

Next, the surface of the substrate 3600 is exposed by grinding treatment, polishing treatment, or CMP (chemical mechanical polishing). Here, by exposure of the surface of the substrate 3600, a region 3612 and a region 3613 are each formed between insulating films 3611 which are formed in the recessed portions 3608 of the substrate 3600. The insulating film 3610 formed over the surface of the substrate 3600 is removed by grinding treatment, polishing treatment, or CMP, so that the insulating films 3611 are obtained. Then, by selective introduction of an impurity element imparting p-type conductivity, a p-well 3615 is formed in the region 3613 of the substrate 3600 (see FIG. 19A).

As an impurity element imparting p-type conductivity, boron, aluminum, gallium, or the like can be used. Here, boron is introduced into the region 3613 as the impurity element.

Further, although an impurity element is not introduced into the region 3612 in one mode of this embodiment because an n-type semiconductor substrate is used as the substrate 3600, an n-well may be formed in the region 3612 by introduction of an impurity element imparting n-type conductivity. As an impurity element imparting n-type conductivity, phosphorus, arsenic, or the like can be used.

When a p-type semiconductor substrate is used, on the other hand, an impurity element imparting n-type conductivity may be introduced into the region 3612 to form an n-well, whereas an impurity element may not be introduced into the region 3613.

Figure 19B:
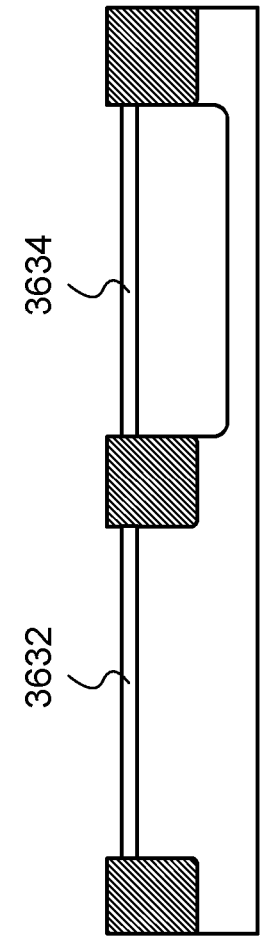

Next, an insulating film 3632 and an insulating film 3634 are formed over the surfaces of the region 3612 and the region 3613 in the substrate 3600, respectively (see FIG. 19B).

For example, the surfaces of the region 3612 and the region 3613 provided in the substrate 3600 are oxidized by heat treatment, so that the insulating film 3632 and the insulating film 3634 can be formed using silicon oxide films. Alternatively, the insulating film 3632 and the insulating film 3634 may be formed to have a stacked structure of a silicon oxide film and a film containing oxygen and nitrogen (a silicon oxynitride film) by the steps of forming a silicon oxide film by a thermal oxidation method and then nitriding the surface of the silicon oxide film by nitridation treatment.

Further alternatively, the insulating film 3632 and the insulating film 3634 may be formed by plasma treatment as described above. For example, the insulating film 3632 and the insulating film 3634 can be formed using a silicon oxide film or a silicon nitride film which is obtained by application of high-density plasma oxidation or high-density plasma nitridation treatment to the surfaces of the region 3612 and the region 3613 provided in the substrate 3600. Furthermore, after high-density plasma oxidation treatment is applied to the surfaces of the region 3612 and the region 3613, high-density plasma nitridation treatment may be performed. In that case, silicon oxide films are formed so as to be in contact with the surfaces of the region 3612 and the region 3613, and then silicon oxynitride films are formed on the silicon oxide films. Thus, the insulating film 3632 and the insulating film 3634 are each formed to have a stacked structure of the silicon oxide film and the silicon oxynitride film. In addition, after silicon oxide films are formed on the surfaces of the region 3612 and the region 3613 by a thermal oxidation method, high-density plasma oxidation or high-density plasma nitridation treatment may be applied to the silicon oxide films.

The insulating film 3632 and the insulating film 3634 formed over the region 3612 and the region 3613 of the semiconductor substrate 3600, respectively, function as gate insulating films of transistors which will be completed later.

Figure 19C:
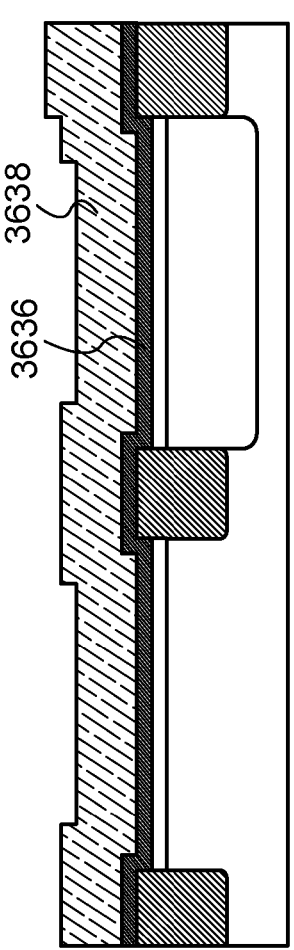

Next, a conductive film is formed so as to cover the insulating film 3632 and the insulating film 3634 which are formed over the region 3612 and the region 3613 provided in the substrate 3600, respectively (see FIG. 19C). Here, an example is shown in which a conductive film 3636 and a conductive film 3638 are sequentially stacked as the conductive film. It is needless to say that the conductive film may be formed to have a single layer or a stacked structure of three or more layers.

As materials of the conductive film 3636 and the conductive film 3638, an element selected from tantalum, tungsten, titanium, molybdenum, aluminum, copper, chromium, niobium, or the like, or an alloy material or a compound material containing the elements as its main component can be used. Alternatively, a metal nitride film obtained by nitridation of the above element can be used. Besides, a semiconductor material typified by polycrystalline silicon doped with an impurity element such as phosphorus can be used.

Here, a stacked structure is employed in which the conductive film 3636 is formed using a tantalum nitride film and the conductive film 3638 is formed thereover using a tungsten film. It is possible to form the conductive film 3636 as a single layer or stacked layers of a film or films including a material selected from tantalum nitride, tungsten nitride, molybdenum nitride, and/or titanium nitride, and form the conductive film 3638 as a single layer or stacked layers of a film or films including a material selected from tungsten, tantalum, molybdenum, and/or titanium.

Figure 20A:
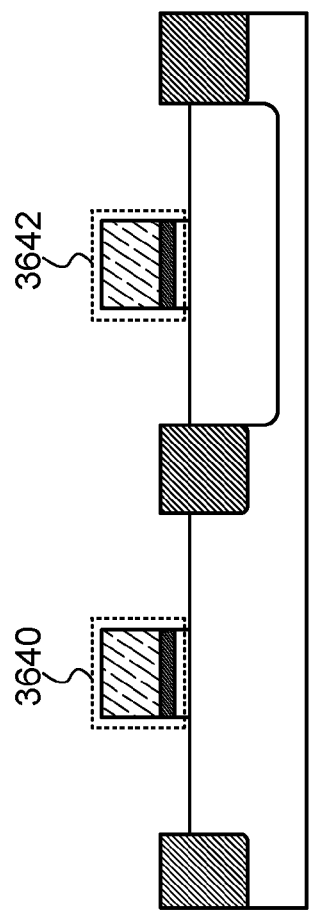
FIGS. 20A to 20C illustrate the method for manufacturing a semiconductor device to which an embodiment of the present invention is applied.

Next, the stacked conductive film 3636 and the conductive film 3638 are selectively removed by etching, so that the conductive film 3636 and the conductive film 3638 remain above part of the region 3612 and the region 3613 of the substrate 3600. Thus, a conductive film 3640 and a conductive film 3642 which function as gate electrodes are formed (see FIG. 20A). Here, the surfaces of the region 3612 and the region 3613 of the substrate 3600 which do not overlap with the conductive film 3640 and the 3642, respectively, are exposed.

Specifically, in the region 3612 of the substrate 3600, part of the insulating film 3632 formed below the conductive film 3640, which does not overlap with the conductive film 3640, is selectively removed, so that the end portions of the conductive film 3640 and the ends of the insulating film 3632 are almost aligned with each other. In addition, in the region 3613 of the substrate 3600, part of the insulating film 3634 formed below the conductive film 3642, which does not overlap with the conductive film 3642, is selectively removed, so that the end portions of the conductive film 3642 and the ends of the insulating film 3634 are almost aligned with each other.

In this case, the part of the insulating films and the like which do not overlap with the conductive film 3640 and the conductive film 3642 may be removed at the same time as the formation of the conductive film 3640 and the conductive film 3642. Alternatively, the part of the insulating films and the like which do not overlap with the conductive film 3640 and the conductive film 3642 may be removed using resist masks which are left after the formation of the conductive film 3640 and the conductive film 3642 or the conductive film 3640 and the conductive film 3642 as masks.

Figure 20B:
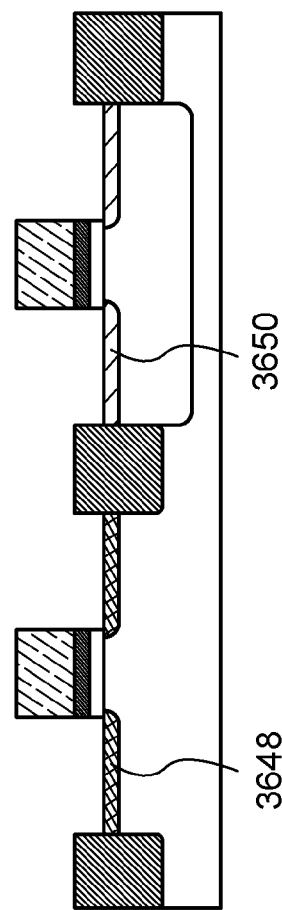

Then, an impurity element is selectively introduced into the region 3612 and the region 3613 of the substrate 3600 (see FIG. 20B). Here, an impurity element imparting n-type conductivity is selectively introduced into the region 3613, using the conductive film 3642 as a mask, to form an impurity region 3650. In addition, an impurity element imparting p-type conductivity is selectively introduced into the region 3612, using the conductive film 3640 as a mask, to form an impurity region 3648. As an impurity element imparting n-type conductivity, phosphorus, arsenic, or the like can be used. As an impurity element imparting p-type conductivity, boron, aluminum, gallium, or the like can be used.

Next, sidewalls 3654 which are in contact with the side surfaces of the conductive film 3640 and the conductive film 3642 are formed. Specifically, the sidewalls are formed as a single layer or stacked layers of a film containing an inorganic material such as silicon, an oxide of silicon, or a nitride of silicon, or a film containing an organic material such as an organic resin, by a plasma CVD method, a sputtering method, or the like. Then, such an insulating film is selectively etched using anisotropic etching which etches mainly in a perpendicular direction so that the sidewalls 3654 can be formed so as to be in contact with the side surfaces of the conductive film 3640 and the conductive film 3642. The sidewalls 3654 are used as doping masks when LDD (lightly doped drain) regions are formed. In addition, here, the sidewalls 3654 are formed to be in contact with the side surfaces of the insulating films formed below the conductive film 3640 and the conductive film 3642.

Figure 20C:
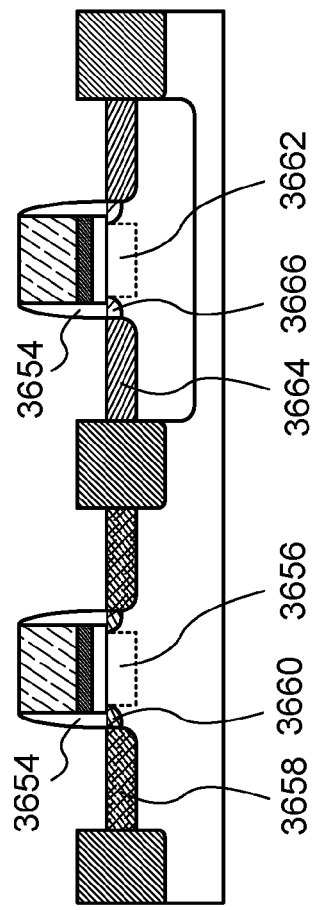

Next, an impurity element is introduced into the region 3612 and the region 3613 of the substrate 3600, using the sidewalls 3654, the conductive film 3640, and the conductive film 3642 as masks, so that impurity regions which each function as a source region or a drain region are formed (see FIG. 20C). Here, an impurity element imparting n-type conductivity is introduced into the region 3613 of the substrate 3600 at higher concentration than in the LDD region, using the sidewalls 3654 and the conductive film 3642 as masks, whereas an impurity element imparting p-type conductivity is introduced into the region 3612 at higher concentration than in the LDD region, using the sidewalls 3654 and the conductive film 3640 as masks.

As a result, impurity regions 3658 which form a source region and a drain region, low-concentration impurity regions 3660 which form LDD regions, and a channel formation region 3656 are formed in the region 3612 of the substrate 3600. Meanwhile, impurity regions 3664 which form a source region and a drain region, low-concentration impurity regions 3666 which form LDD regions, and a channel formation region 3662 are formed in the region 3613 of the substrate 3600.

In one mode of this embodiment, the impurity elements are introduced under the condition that part of the region 3612 and the region 3613 of the substrate 3600 which do not overlap with the conductive film 3640 and the conductive film 3642 are exposed. Accordingly, the channel formation region 3656 and the channel formation region 3662 which are formed in the region 3612 and the region 3613 of the substrate 3600, respectively, can be formed in a self-aligned manner, using the conductive film 3640 and the conductive film 3642.

Figure 21A:
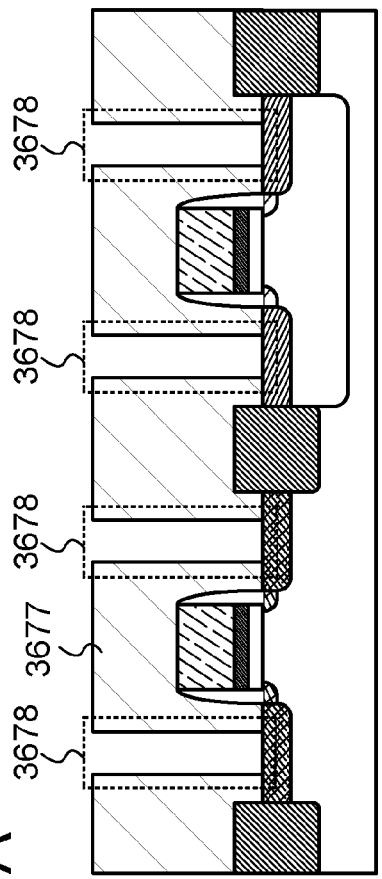
FIGS. 21A and 21B illustrate the method for manufacturing a semiconductor device to which an embodiment of the present invention is applied.

Next, an insulating film is formed so as to cover the insulating films, the conductive films, and the like which are provided over the region 3612 and the region 3613 of the substrate 3600, and openings 3678 are formed in the insulating film, so that an insulating film 3677 is formed (see FIG. 21A).

The insulating film 3677 can be provided by a CVD method, a sputtering method, or the like as a single layer or stacked layers of an insulating film containing oxygen and/or nitrogen, such as silicon oxide ($SiO_x$), silicon nitride ($SiN_x$), silicon oxynitride ($SiO_xN_y$, where x>y), or silicon nitride oxide ($SiN_xO_y$, where x>y); a film containing carbon, such as DLC (diamond-like carbon); an organic material such as epoxy, polyimide, polyamide, polyvinyl phenol, benzocyclobutene, or acrylic; or a siloxane material such as a siloxane resin. Note that the siloxane material corresponds to a material having a Si—O—Si bond. Siloxane has a skeleton structure formed from bonds of silicon and oxygen. As a substituent, an organic group (e.g., an alkyl group or an aryl group) or a fluoro group may be used. The organic group may contain a fluoro group.

Figure 21B:
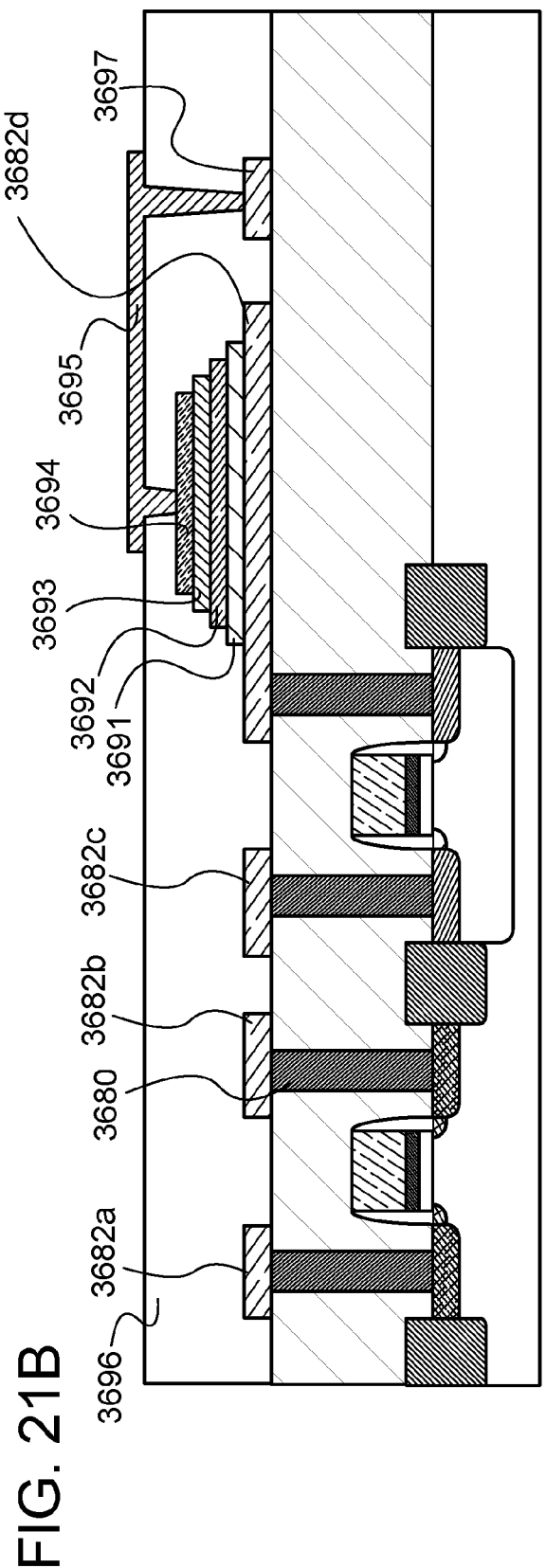

Next, conductive films 3680 are formed in the openings 3678 by a CVD method or the like. Then, a conductive film 3682a, a conductive film 3682b, a conductive film 3682c, and a conductive film 3682d are selectively formed over the insulating film 3677 so as to be electrically connected to the conductive films 3680 (see FIG. 21B).

The conductive films 3680 and the conductive films 3682a to 3682d are formed as a single layer or stacked layers, using an element selected from aluminum, tungsten, titanium, tantalum, molybdenum, nickel, platinum, copper, gold, silver, manganese, neodymium, carbon, or silicon, or an alloy material or a compound material containing the elements as its main component, by a CVD method, a sputtering method, or the like. An alloy material containing aluminum as its main component corresponds to, for example, a material which contains aluminum as its main component and also contains nickel, or an alloy material which contains aluminum as its main component and which also contains nickel and one of or both carbon and silicon. As for the stacked layer, the conductive films 3680 and the conductive films 3682a to 3682d preferably employ, for example, a stacked structure including a barrier film, an aluminum-silicon film, and a barrier film, or a stacked structure including a barrier film, an aluminum-silicon film, a titanium nitride film, and a barrier film. Note that a barrier film is provided using a thin film formed using titanium, a nitride of titanium, molybdenum, or a nitride of molybdenum. Since aluminum and aluminum silicon have low resistance and are inexpensive, it is optimum as a material of the conductive films 3680 and the conductive films 3682a to 3682d. Further, generation of hillocks of aluminum and aluminum silicon can be prevented when upper and lower barrier layers are formed. Furthermore, when the barrier film is formed using titanium which is a highly-reducible element, even if a thin native oxide film is formed over a crystalline semiconductor film, the native oxide film can be reduced and removed, so that preferable contact with the crystalline semiconductor film can be obtained. Here, the conductive films 3680 and the conductive films 3682a to 3682d can be formed by selective growth of tungsten by a CVD method.

Through the above steps, a p-channel transistor formed in the region 3612 of the substrate 3600 and an n-channel transistor formed in the region 3613 of the substrate 3600 can be obtained.

Note that the structure of transistors applied to an embodiment of the present invention is not limited to the structure illustrated in drawings. For example, a transistor with an inverted staggered structure, a FinFET structure, or the like can be applied. A FinFET structure is preferable because it can suppress a short channel effect which occurs along with reduction in transistor size.

The semiconductor device according to an embodiment of the present invention includes a battery which can store electric power and supply electric power to the signal processing circuit. As the battery, a capacitor such as an electric double layer capacitor or a thin-film secondary battery is preferably used. Thus, in one mode of this embodiment, a connection between the transistor and a thin-film secondary battery is described.

In one mode of this embodiment, the secondary battery is stacked over the conductive film 3682d connected to the transistor. The secondary battery has a structure in which a current-collecting thin film, a negative electrode active material layer, a solid electrolyte layer, a positive electrode active material layer, and a current-collecting thin film are sequentially stacked (see FIG. 21B). Therefore, the material of the conductive film 3682d which also has a function of the current-collecting thin film of the secondary battery needs to have low resistance and high adhesion to the negative electrode active material. Aluminum, copper, nickel, vanadium, or the like is particularly preferable as the material.

When the structure of the thin film secondary battery is described in detail, a negative electrode active material layer 3691 is formed over the conductive film 3682d. In general, vanadium oxide ($V_2O_5$) or the like is used. Next, a solid electrolyte layer 3692 is formed over the negative electrode active material layer 3691. In general, lithium phosphate ($Li_3PO_4$) or the like is used. Then, a positive electrode active material layer 3693 is formed over the solid electrolyte layer 3692. In general, lithium manganate ($LiMn_2O_4$) or the like is used. Alternatively, lithium cobaltate ($LiCoO_2$) or lithium nickelate ($LiNiO_2$) may be used. Next, a current-collecting thin film 3694 that becomes an electrode is formed over the positive electrode active material layer 3693. The current-collecting thin film 3694 needs to have low resistance and high adhesion to the positive electrode active material layer 3693. Aluminum, copper, nickel, vanadium, or the like can be used as the current-collecting thin film 3694.

Each of the foregoing thin film layers, that is, the negative electrode active material layer 3691, the solid electrolyte layer 3692, the positive electrode active material layer 3693, and the current-collecting thin film 3694, may be formed using a sputtering technique or an evaporation technique. The thickness of each layer is preferably 0.1 μm to 3 μm.

Next, a resin film is formed by a spin coating method or the like. Then, the resin film is etched to form a contact hole, so that an interlayer film 3696 is formed. The interlayer film 3696 is not limited to a resin film, and the interlayer film may be another film such as an oxide film formed by a CVD method; however, a resin film is preferable in terms of flatness. Alternatively, when a photosensitive resin is used, the contact hole can be formed without etching. Then, a wiring layer 3695 is formed over the interlayer film 3696 and the wiring layer 3695 is connected to a wiring 3697, whereby electrical connection with the secondary battery is obtained.

With the above-described structure, the semiconductor device according to an embodiment of the present invention can have a structure in which transistors are formed over a single crystal substrate and a thin-film secondary battery is formed thereover. Thus, in one mode of this embodiment, a semiconductor device which is very thin and small can be formed.

Note that the manufacturing method of a semiconductor device according to one mode of this embodiment can be applied to any of the semiconductor devices described in this specification. That is, according to one mode of this embodiment, a semiconductor device capable of transmitting and receiving information can be manufactured in such a manner that a difference between a signal line and a reference line in a signal waveform is detected so that a demodulation signal is generated and a demodulation signal is generated stably even from a signal whose modulation factor is small.

Further, a semiconductor device which can demodulate a signal by canceling noise of each line and reducing influence of noise which results from a carrier wave can be manufactured.

Furthermore, a semiconductor device which can stably detect a signal also as to a wireless signal whose modulation factor is 10% and stably perform signal transmission and reception which are based on ISO/IEC 15693 can be manufactured.

In the semiconductor device according to an embodiment of the present invention, power from a power source is continuously supplied during reception of a wireless signal; therefore, the semiconductor device can be operated stably. Further, the semiconductor device can be wirelessly charged; therefore, shortage of power for transmitting and receiving individual information, which is due to deterioration of a battery over time, can be compensated.

Further, a semiconductor device can be manufactured in which a difference between an output of a first bias circuit and an output of a second bias circuit is detected so that a demodulation signal is generated, a demodulation signal can be generated stably even from a signal whose modulation factor is small, and a signal can be demodulated by reducing influence of noise.

Moreover, in the semiconductor device according to an embodiment of the present invention, power from a power source is continuously supplied during reception of a carrier wave whose modulation factor is 10%; therefore, the semiconductor device can be operated stably. Further, the semiconductor device can be wirelessly charged; therefore, shortage of power for transmitting and receiving individual information, which is due to deterioration of a battery over time, can be compensated.

Embodiment 5

Figure 22E:
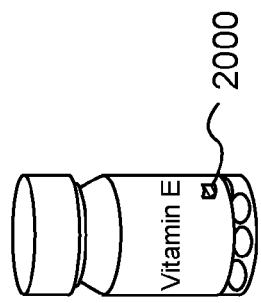
FIGS. 22A to 22F illustrate application examples of a semiconductor device to which an embodiment of the present invention is applied.
Figure 22F:
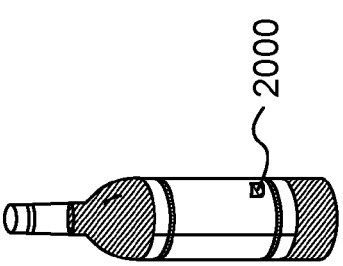
Figure 22C:
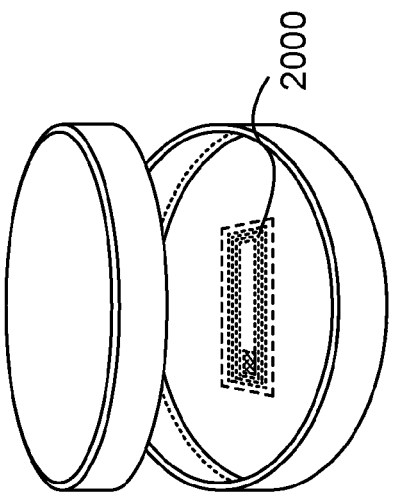
Figure 22D:
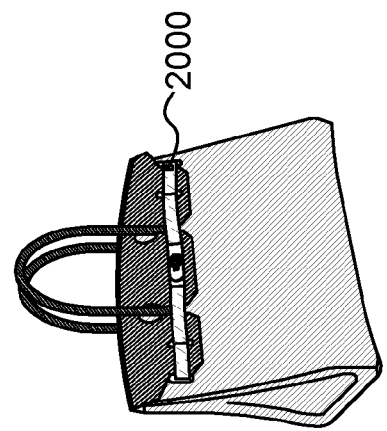
Figure 22A:
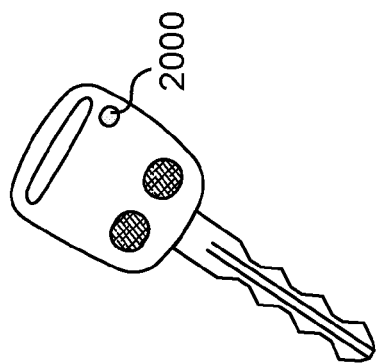
Figure 22B:
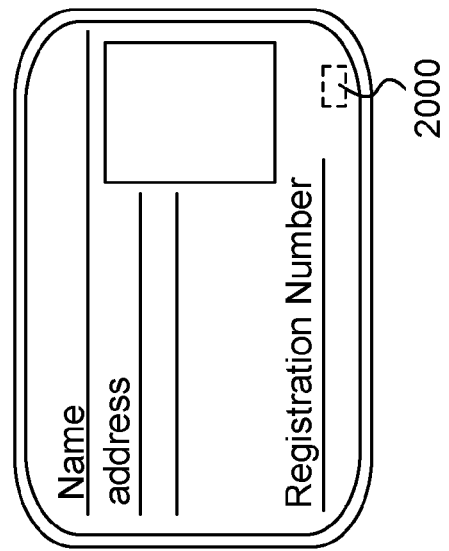

A semiconductor device 2000 to which an embodiment of the present invention is applied can be used for a variety of articles and systems by utilizing a function of transmitting and receiving an electromagnetic wave. As the articles, the following are given: keys (see FIG. 22A), paper money, coins, securities, bearer bonds, certificates (such as a driver's license or a resident's card; see FIG. 22B), books, containers (such as a Petri dish; see FIG. 22C), packaging containers (such as wrapping paper or bottles; see FIGS. 22E and 22F), recording media (such as a disk or video tape), vehicles (such as a bicycle), belongings (such as bags or eyeglasses; see FIG. 22D), food, clothing, commodities, electronic appliances (such as a liquid crystal display device, an EL display device, a television device, or a portable terminal), or the like. The semiconductor device according to an embodiment of the present invention is fixed or mounted to articles of a variety of forms such as those above by being attached to or embedded on the surface. Further, a system refers to an article management system, an authentication function system, a distribution system, or the like.

With the use of the semiconductor device according to an embodiment of the present invention, the semiconductor device can be operated while being continuously supplied with power through wireless communication. In addition, noise of a carrier wave can be reduced.

Moreover, with the use of the semiconductor device according to an embodiment of the present invention, the semiconductor device can be operated during reception of a carrier wave whose modulation factor is 10% while power from a power source is continuously supplied. In addition, noise of the carrier wave can be reduced. This embodiment can be freely combined with any of the other embodiments.

The present application is based on Japanese Patent Application serial No. 2009-100104 filed with Japan Patent Office on Apr. 16, 2009, the entire contents of which are hereby incorporated by reference.

What is claimed is:
1. A semiconductor device comprising:
a first demodulation circuit having an output portion;
a second demodulation circuit having an output portion;
a first bias circuit having a first input portion, a second input portion, and an output portion;
a second bias circuit having a first input portion, a second input portion, and an output portion;
a comparator having a first input portion, a second input portion, and an output portion;
an analog buffer circuit having an input portion and an output portion; and
a pulse detection circuit having an input portion, a first output portion, and a second output portion, wherein the output portion of the first demodulation circuit is electrically connected to the first input portion of the first bias circuit, wherein the output portion of the second demodulation circuit is electrically connected to the first input portion of the second bias circuit, wherein the second input portion of the first bias circuit is electrically connected to the first output portion of the pulse detection circuit, wherein the second input portion of the second bias circuit is electrically connected to the second output portion of the pulse detection circuit, wherein the output portion of the first bias circuit is electrically connected to the first input portion of the comparator, wherein the output portion of the second bias circuit is electrically connected to the second input portion of the comparator, wherein the output portion of the comparator is electrically connected to the input portion of the analog buffer circuit, and wherein the output portion of the analog buffer circuit is electrically connected to the input portion of the pulse detection circuit.

2. The semiconductor device according to claim 1, wherein an input portion of each of the first demodulation circuit and the second demodulation circuit is electrically connected to an antenna.

3. The semiconductor device according to claim 1, wherein an input portion of each of the first demodulation circuit and the second demodulation circuit is electrically connected to an antenna, and wherein the antenna is annular or helical.

4. The semiconductor device according to claim 1, wherein the comparator comprises any one of a differential circuit, a differential amplifier, or an operational amplifier.

5. The semiconductor device according to claim 1, wherein the analog buffer circuit comprises a source follower circuit and a constant current circuit.

6. The semiconductor device according to claim 1, wherein the pulse detection circuit comprises an inverter circuit, a delay circuit, and a buffer circuit.

7. A semiconductor device comprising:
a first demodulation circuit having an output portion;
a second demodulation circuit having an output portion;
a first bias circuit having a first input portion, a second input portion, and an output portion;
a second bias circuit having a first input portion, a second input portion, and an output portion;
a comparator having a first input portion, a second input portion, and an output portion;
an analog buffer circuit having an input portion and an output portion; and
a pulse detection circuit having an input portion, a first output portion, and a second output portion, wherein the output portion of the first demodulation circuit is electrically connected to the first input portion of the first bias circuit, wherein the output portion of the second demodulation circuit is electrically connected to the first input portion of the second bias circuit, wherein the second input portion of the first bias circuit is electrically connected to the first output portion of the pulse detection circuit, wherein the second input portion of the second bias circuit is electrically connected to the second output portion of the pulse detection circuit, wherein the output portion of the first bias circuit is electrically connected to the first input portion of the comparator, wherein the output portion of the second bias circuit is electrically connected to the second input portion of the comparator, wherein the output portion of the comparator is electrically connected to the input portion of the analog buffer circuit, wherein the output portion of the analog buffer circuit is electrically connected to the input portion of the pulse detection circuit, wherein the first demodulation circuit demodulates a first signal, wherein the second demodulation circuit demodulates a second signal, and wherein the first signal is an inverted signal of the second signal.

8. The semiconductor device according to claim 7, wherein an input portion of each of the first demodulation circuit and the second demodulation circuit is electrically connected to an antenna.

9. The semiconductor device according to claim 7, wherein an input portion of each of the first demodulation circuit and the second demodulation circuit is electrically connected to an antenna, and wherein the antenna is annular or helical.

10. The semiconductor device according to claim 7, wherein the comparator comprises any one of a differential circuit, a differential amplifier, or an operational amplifier.

11. The semiconductor device according to claim 7, wherein the analog buffer circuit comprises a source follower circuit and a constant current circuit.

12. The semiconductor device according to claim 7, wherein the pulse detection circuit comprises an inverter circuit, a delay circuit, and a buffer circuit.

13. A semiconductor device comprising:
a first demodulation circuit having an output portion;
a second demodulation circuit having an output portion;
a first bias circuit having a first input portion, a second input portion, and an output portion;
a second bias circuit having a first input portion, a second input portion, and an output portion;
a comparator having a first input portion, a second input portion, and an output portion;
an analog buffer circuit having an input portion and an output portion; and
a pulse detection circuit having an input portion, a first output portion, and a second output portion, wherein the output portion of the first demodulation circuit is electrically connected to the first input portion of the first bias circuit, wherein the output portion of the second demodulation circuit is electrically connected to the first input portion of the second bias circuit, wherein the second input portion of the first bias circuit is electrically connected to the first output portion of the pulse detection circuit, wherein the second input portion of the second bias circuit is electrically connected to the second output portion of the pulse detection circuit, wherein the output portion of the first bias circuit is electrically connected to the first input portion of the comparator, wherein the output portion of the second bias circuit is electrically connected to the second input portion of the comparator, wherein the output portion of the comparator is electrically connected to the input portion of the analog buffer circuit,
wherein the output portion of the analog buffer circuit is electrically connected to the input portion of the pulse detection circuit,
wherein the first output portion of the pulse detection circuit outputs a first signal,
wherein the second output portion of the pulse detection circuit outputs a second signal, and
wherein the first signal is an inverted signal of the second signal.

14. The semiconductor device according to claim 13, wherein an input portion of each of the first demodulation circuit and the second demodulation circuit is electrically connected to an antenna.

15. The semiconductor device according to claim 13, wherein an input portion of each of the first demodulation circuit and the second demodulation circuit is electrically connected to an antenna, and wherein the antenna is annular or helical.

16. The semiconductor device according to claim 13, wherein the comparator comprises any one of a differential circuit, a differential amplifier, or an operational amplifier.

17. The semiconductor device according to claim 13, wherein the analog buffer circuit comprises a source follower circuit and a constant current circuit.

18. The semiconductor device according to claim 13, wherein the pulse detection circuit comprises an inverter circuit, a delay circuit, and a buffer circuit.

* * * * *